(12) United States Patent
Aggarwal et al.

(10) Patent No.: US 11,063,973 B2
(45) Date of Patent: Jul. 13, 2021

(54) REMOTE CONFIGURATION OF SECURITY GATEWAYS

(71) Applicant: Visa International Service Association, San Francisco, CA (US)

(72) Inventors: Abhinav Aggarwal, Palo Alto, CA (US); Mahdi Zamani, Palo Alto, CA (US); Mihai Christodorescu, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

(21) Appl. No.: 16/626,478

(22) PCT Filed: Aug. 20, 2018

(86) PCT No.: PCT/US2018/047078
§ 371 (c)(1),
(2) Date: Dec. 24, 2019

(87) PCT Pub. No.: WO2019/036717
PCT Pub. Date: Feb. 21, 2019

(65) Prior Publication Data
US 2020/0120121 A1   Apr. 16, 2020

Related U.S. Application Data

(60) Provisional application No. 62/547,701, filed on Aug. 18, 2017.

(51) Int. Cl.
*H04L 29/06* (2006.01)
*H04W 88/16* (2009.01)

(52) U.S. Cl.
CPC ...... *H04L 63/1425* (2013.01); *H04L 63/0227* (2013.01); *H04L 63/1433* (2013.01);
(Continued)

(58) Field of Classification Search
CPC ............ H04L 63/1425; H04L 63/0227; H04L 63/1433; H04L 63/1441; H04L 63/164; H04L 63/20; H04L 67/34; H04W 88/16
See application file for complete search history.

(56) References Cited

U.S. PATENT DOCUMENTS

| 8,042,149 B2 * | 10/2011 | Judge ................. H04L 63/1408 726/1 |
| 2003/0145232 A1 * | 7/2003 | Poletto ............... H04L 63/1408 726/22 |

(Continued)

OTHER PUBLICATIONS

PCT/US2018/047078, "International Search Report and Written Opinion", dated Jan. 3, 2019, 15 pages.

*Primary Examiner* — Meng Li
(74) *Attorney, Agent, or Firm* — Kilpatrick Townsend & Stockton LLP

(57) ABSTRACT

Methods and systems for generating a security policy at a gateway are disclosed. A server computer and a gateway can perform a protocol in order to train a security model at a gateway, such that it can detect attack packets and prevent those attack packets from reaching the server computer via the gateway. In a learning phase, the server computer can provide training packets and test packets to the gateway. The gateway can use the training packets to train a security model, and the gateway can classify the test packets using the security model in order to test its accuracy. When the server computer is satisfied with the accuracy of the security policy, the server computer can transmit an acceptance of the security policy to the gateway, which can subsequently deploy the model in order to detect and filter attack packets.

20 Claims, 11 Drawing Sheets

(52) U.S. Cl.
CPC ........ *H04L 63/1441* (2013.01); *H04L 63/164* (2013.01); *H04L 63/20* (2013.01); *H04W 88/16* (2013.01)

(56) References Cited

U.S. PATENT DOCUMENTS

| | | | |
|---|---|---|---|
| 2010/0333167 A1 | 12/2010 | Luo et al. | |
| 2014/0090061 A1* | 3/2014 | Avasarala | G06F 21/56 726/24 |
| 2015/0193694 A1* | 7/2015 | Vasseur | G06N 20/00 706/12 |
| 2015/0326598 A1* | 11/2015 | Vasseur | H04L 63/1433 726/25 |
| 2016/0366158 A1* | 12/2016 | Feng | H04L 63/145 |
| 2018/0240031 A1* | 8/2018 | Huszar | G06N 20/00 |

* cited by examiner

REMOTE CONFIGURATION OF SECURITY GATEWAYS

CROSS-REFERENCE TO RELATED APPLICATIONS

This application is a 35 U.S.C. 371 patent application of PCT application No. PCT/US2018/047078, which claims priority to U.S. Patent Application No. 62/547,701, filed on Aug. 18, 2017, which is herein incorporated by reference in its entirety for all purposes.

BACKGROUND

Enterprise and home network systems are typically connected to the Internet via security gateways, which may have security features such as firewalls, intrusion detection systems, and data-leakage protection systems. These gateways are designed to protect the local network against attacks originating from the Internet. This network architecture is widely prevalent, and most network routers have a built-in firewall. While a firewall can protect the local network from malicious ingoing traffic, firewalls are usually are not designed to protect the Internet from malicious outgoing traffic.

Some gateways can filter outgoing traffic, primarily to prevent sensitive-data ex-filtration and to detect infected local nodes. For example, this filtering applies to outgoing traffic destined to or originated from certain ports (e.g., blocking known malware related ports or broadcast traffic) or with certain contents (e.g., blocking HTTP requests to known bad servers). A network administrator can manage outgoing filtering in order to improve the security of the local network. Unfortunately, in most cases, the security of the rest of the Internet is not considered, leading to frequent, unmitigated, and widespread malware infections.

Infected systems are often used by hackers to attack computers or servers over the Internet. Among these attacks is the Denial of Service (DoS) attack, in which an attack source spams a targeted server with attack packets. These attack packets generally correspond to superfluous service requests. Processing these attack packets wastes a considerable amount of time for the server, and as a result, the server computer does not have enough time to process legitimate service packets from legitimate client computers.

In order to protect itself from such attacks, a server computer can use a firewall and a network intrusion detection system. Further, the server computer may evaluate incoming network packets to determine if those network packets are attack packets or service packets. However, it is difficult for a busy server computer to accurately detect attack packets from among a high volume of network traffic. As a result, attack packets are frequently undetected and some service packets may be misidentified as attack packets, denying service to legitimate users.

SUMMARY

Embodiments of the inventions are directed to methods and systems used to deploy a protocol to a gateway that is upstream from a server computer that is being attacked. The protocol can allow a server computer to outsource network security tasks to a gateway in a network such as the Internet. Rather than, or in addition to blocking received attack packets, the server computer can train a gateway to identify and filter incoming attack packets. The gateway can be trained in an interactive learning process with the server computer, comprising a number of learning rounds. In each learning round, the server computer can transmit training packets and test packets to the gateway. The gateway can use the training packets to train a security model, and the test packets can be used to evaluate the security model. Once the security model is adequately trained, the gateway can use the security model to classify network packets that pass through the gateway as either service packets or attack packets. The gateway can filter and block attack packets using the security model, while allowing service packets to reach the server computer. In this way, the server computer can outsource attack packet detection to the server. The server computer can transmit a learning reward to the gateway server for completing the learning process and can periodically transmit a service reward to the gateway for deploying the security model.

One embodiment is directed to a method of deploying a protocol at a gateway, the method comprising performing, by a server computer: receiving a plurality of network packets, wherein the plurality of network packets comprises a plurality of attack packets that are part of an attack on the server computer and a plurality of services packets that are not part of the attack on the server computer; determining the plurality of network packets comprises a plurality of attack packets; selecting a gateway through which the plurality of attack packets flow; and performing a learning process with the gateway, the learning process comprising one or more learning rounds, each learning round comprising: obtaining and labelling a set of training packets from the plurality of network packets, the set of training packets comprising one or more labeled attack packets and one or more labeled service packets; transmitting, to the gateway, the set of training packets and the set of unlabeled test packets; receiving a set of test classifications from the gateway; determining an accuracy value based on a proportion of accurate classifications from the set of test classifications; if the accuracy value is greater than or equal to an accuracy threshold, transmitting an acceptance of the security model to the gateway; and if the accuracy value is less than the accuracy threshold, transmitting a rejection of the security model to the gateway.

Another embodiment is directed to a method of deploying a protocol at a gateway, the method comprising performing, by a gateway: performing a learning process with a server computer, the learning process comprising one or more learning rounds, each learning round comprising: receiving a labeled set of training packets comprising one or more labeled attack packets that are part of an attack on the server computer and one or more labeled service packets that are not part of the attack on the server computer, and an unlabeled set of test packets comprising one or more unlabeled attack packets that are part of the attack on the server computer and one or more unlabeled service packets that are not part of the attack on the server computer; training a security model using the labeled set of training packets; generating a set of test classifications corresponding to the set of unlabeled test packets; transmitting the set of test classifications to the server computer; if an accuracy value is greater than an accuracy threshold, receiving an acceptance of the security model from the server computer; and if the accuracy value is less than the accuracy threshold, receiving a rejection of the security model from the server computer.

These and other embodiments of the disclosure are described in detail below. For example, other embodiments are directed to systems, devices, and computer readable media associated with methods described herein.

A better understanding of the nature and advantages of embodiments of the present disclosure may be gained with reference to the following detailed description and the accompanying drawings.

Terms

A "server computer" may include a powerful computer or cluster of computers. For example, the server computer can be a large mainframe, a minicomputer cluster, or a group of servers functioning as a unit. In one example, the server computer may be a database server coupled to a web server. The server computer may comprise one or more computational apparatuses and may use any of a variety of computing structures, arrangements, and compilations for servicing the requests from one or more client computers.

A "memory" may be any suitable device or devices that may store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may refer to any suitable data computation device or devices. A processor may comprise one or more microprocessors working together to accomplish a desired function. The processor may include a CPU that comprises at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "gateway" may refer to networking hardware that allows data to flow from one network to another. For example, in a local area network, a router may serve as a gateway that allows data to flow from computers in the local area network to the Internet. Gateways can also route or direct network traffic to its intended recipient. Gateways may employ firewalls, security policies, or security models in order to protect the networks from attack packets or other malicious data. A gateway may have a "managed IP address range" corresponding to IP addresses of devices included in a gateway's network. For example, a router's managed IP address range may contain the IP addresses corresponding to each device in the router's local area network.

A "network packet" may refer to a formatted unit of data transmitted over a network. A packet may comprise control information and a payload. Control information may provide data for delivering the payload, such as source and destination network addresses (e.g., IP addresses), error detection codes, and sequencing information. Typically, control information is found in network packet headers and trailers.

An "attack packet" may refer to a packet that is transmitted as part of an attack on a server computer over a network, such as a DoS attack or an SQL injection. It may also refer to a packet that isn't part of an attack, but is undesirable for the server (e.g., packets corresponding to spam emails). In some cases, an attack packet may include malicious data in its payload, such as viruses, computer worms, or SQL statements used to exploit database vulnerabilities. In others, attack packets may not comprise malicious data, e.g., in the case of a DoS attack, where the payload data appears to be a legitimate service request, but is actually part of an attack packet. Attack packets may be "spoofed," such that the source IP address indicated by the attack packet is different from the actual IP address of the attack source.

A "service packet" may refer to a network packet that is transmitted as part of a legitimate service request to a server computer, such as a request to stream video or access an account. The payload in the data packet may comprise information used by the server computer to execute the service request, such as a username or credential.

A "client computer" may refer to a computer that accesses services provided by a server computer. The client computer may communicate with the server computer via networks such as the Internet. The client computer may transmit service packets to the server computer in order to request the service provided by that server computer (e.g., email hosting, streaming videos, etc.)

An "attack source" may refer to a device, computer, or other entity that generates attack packets. An attack source may transmit these attack packets as part of an attack on a server computer, or another computer in a network. An attack source may voluntarily attack a server computer, or may attack a server computer as a result of a malware infection. An attack source perform "IP spoofing" by generating attack packets with a false source IP address for the purpose of hiding its identity or impersonating another computer system.

A "machine learning model" may include an application of artificial intelligence that provides systems with the ability to automatically learn and improve from experience without explicitly being programmed. A machine learning model may include a set of software routines and parameters that can predict an output of a process based on feature vectors or other input data, for example, a network packet classifying model may predict the classification of a network packet based on the information within the packet (e.g., source IP address, destination IP address, time to live value, number of hops, flags, etc.) A structure of the software routines (i.e., number of subroutines and the relationship between the subroutines) and/or the values of the parameters can be determined in a training process, which can use actual results of the process that is being modeled, e.g., the identification of different classes of input data.

A "security model" may refer to a model used to perform network security related functionality, such as identifying and blocking attack packets. A security model can be trained to perform its network security functions. For example, a security model can be a machine learning model used to classify network packets as attack packets or service packets. A security model can also be a rule based system (e.g., a blacklist that blocks all packets from a particular source IP address.)

A "digital stamp" may refer to data, such as an alphanumeric sequence or "string" that is included in a network packet to indicate that the network packet has been "stamped." A network packet may be stamped in order to indicate that the network packet was received at a particular node in a network, such as a gateway in the Internet. A digital stamp may be randomly or pseudorandomly generated, or generated via any other appropriate means. A digital signature may be used in place of a digital stamp in some embodiments.

A "reward" may refer to a thing given to an entity in recognition of the entity's services or achievements. A reward may be monetary, and may be used to compensate an entity for something. As an example, a server computer may transmit a reward to a gateway for training a security model (a learning reward) or transmit a reward to a gateway for filtering attack packets (a service reward).

DETAILED DESCRIPTION

Embodiments are directed to the methods and systems that can be used to deploy a protocol to a gateway that is upstream from a server computer that is under attack. Embodiments can allow a server computer to outsource network security to one or more gateways. Specifically, instead of detecting and filtering attack packets itself, a server computer can perform a learning process to train a security model at a gateway. The gateway can use the security model to detect attack packets and filter them before they reach the server computer.

I. Overview

A method according to some embodiments can comprise three phases: discovery, learning, and service. The discovery phase generally involves the server computer identifying that it is under attack, selecting a gateway through which the attack packets flow, and setting up for the learning phase.

The learning phase generally involves the server computer and the gateway cooperating to train and evaluate a security model at the gateway. The server computer can train the security model itself and transmit it to the gateway, or the server computer can transmit training packets and test packets to the gateway, in order to train and test the security model respectively.

The service phase generally involves the gateway deploying the security model in order to block attack packets from reaching the server computer. Optionally, the server computer can issue rewards to the gateway for learning and deploying the security model. The service phase can also involve conflict resolution, if the server computer fails to provide the gateway with the agreed upon rewards or the gateway fails to deploy the security model.

A. Flowchart

Figure 1:
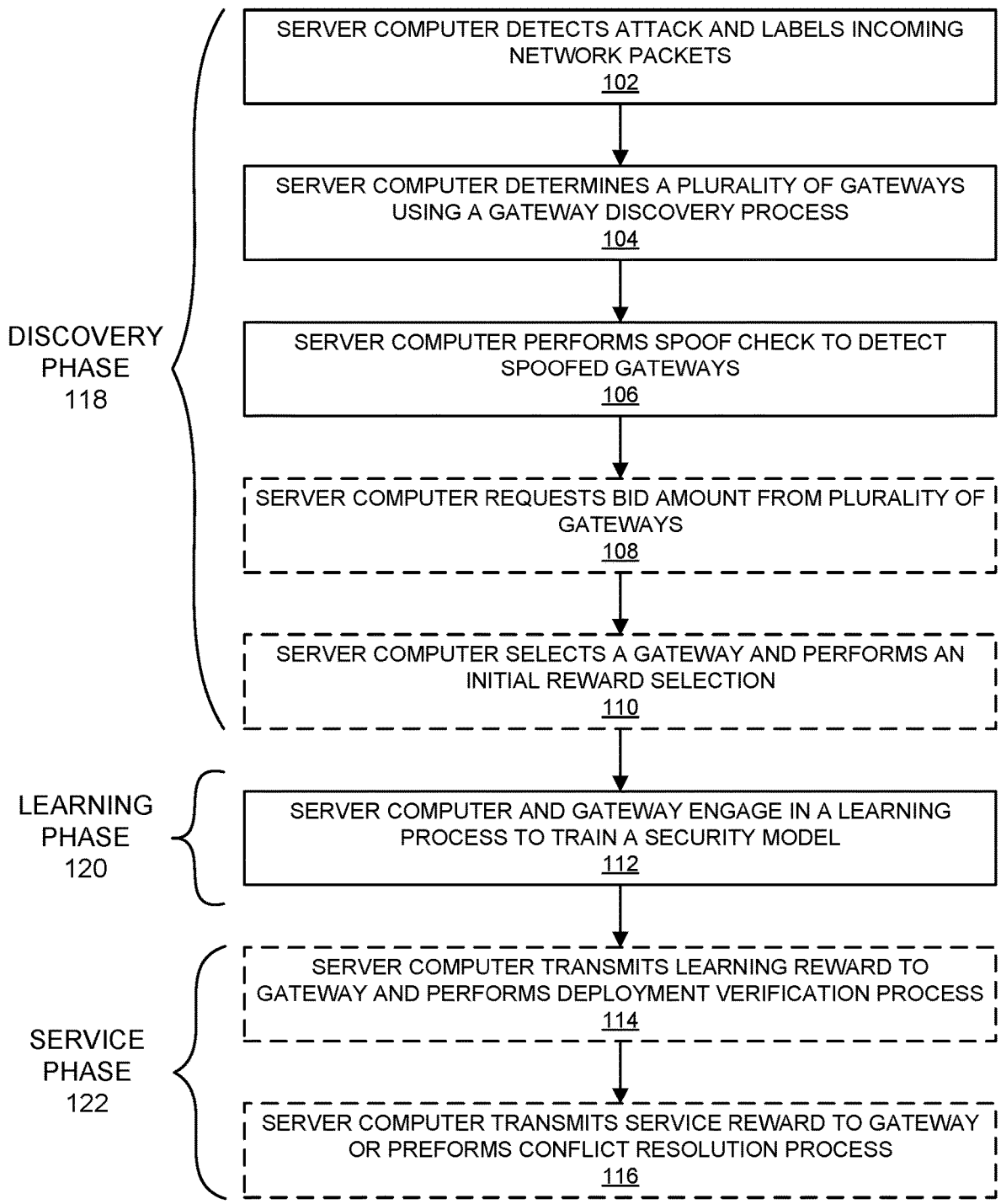
FIG. 1 shows a flowchart of an overview of a method to deploy a protocol to a gateway according to some embodiments.

FIG. 1 shows a flowchart of an overview of a method of deploying a protocol to a gateway according to some embodiments. The method can involve a discovery phase 118, comprising steps 102-110, a learning phase 120 comprising step 112, and a service phase 112 comprising steps 114 and 116. Some steps, particularly those relating to rewards (e.g., steps 108, 110, 114, and 116) may be partially or completely optional.

At step 102, the server computer can determine that it is under attack. The server computer may analyze received network packets and determine that there is some abnormal or malicious characteristic of the received network packets. As an example, the server computer may receive an unusually large number of service requests, and may conclude that it is under a denial of service attack. The server computer can obtain and label a set of training packets from the plurality of network packets and obtain a set of unlabeled test packets from the plurality of network packets. Later, during the learning phase, the server computer can use the labeled training packets as training data for the security model and the labeled test packets to evaluate the security model.

At step 104, the server computer can determine a plurality of candidate gateways using a gateway discovery process. This plurality of candidate gateways may comprises gateways that appear to receive attack packets and forward those attack packets to the server computer. The server computer can discover these gateways by tracing DISCOVERY packets sent to an apparent attack source. The server computer may create a list of gateways, or Glist comprising the plurality of candidate gateways, and may sort the list based on factors such as latency. Gateway discovery can be better understood with reference to the section on gateway discovery below and FIG. 3.

At step 106, the server computer can perform a spoof check to determine if the apparent attack source is spoofing its IP address in order to evade detection or impersonate another computing system. If the apparent attack source isn't the true source of the attack, some of the gateways discovered during gateway discovery may not actually transmit attack packets to the server computer. The spoof check can allow the server computer to determine which gateways actually transmit attack packets to the server computer. The server computer can filter the Glist base on the results of the spoof check, to produce a filtered list, Flist, of a plurality of gateways. Additionally, the server computer may perform a spoof check in the deployment verification phase. The spoof check is described in more detail below with reference to FIG. 4.

At optional step 108, the server computer may requests bids, or "gateway valuations" from the plurality of gateways. Methods according to some embodiments can use an optional reward system in order to compensate gateways for their participation in the protocol. The bids can be used to determine an initial reward value, which is in turn can be used by the server computer to calculate a learning reward. The learning reward can be transmitted to the gateway after the gateway successfully completes the learning phase. Further, the server computer may select a gateway in the gateway selection step based on the bids, e.g., selecting the gateway that produces the lowest bid.

At step 110, the server computer can select a gateway through which the attack packets flow and performs an initial reward selection process. Gateway selection can be performed in a number of ways. As one example, the server computer can uniformly and randomly select a gateway from the plurality of gateways. As another example, the server computer can select a gateway based on the latency between the server computer and that gateway. Alternatively, the server computer can randomly select a gateway, with the probability of selection being proportional to the latency between the server computer and the gateway.

Optionally, the initial reward selection process can involve determining the initial reward value used to calculate the learning reward, which may be proportional to the initial reward value, the gateway's performance during the learning phase, and the packet classification accuracy of the security model. The initial reward selection process is described in further detail below with reference to FIG. 5.

The learning phase 120, comprising step 112, can involve the gateway training the security model using training data provided by the server computer. The learning phase may proceed in learning rounds. In each learning round, the server computer may provide training packets used by the gateway to train the security model and test packets used to evaluate the security model. The server computer can receive a set of test classifications corresponding to the set of test packets, and can determine an accuracy value based on a proportion of accurate classifications from the set of test classifications. If the accuracy value exceeds an accuracy threshold, the security model has been successfully trained and the server computer can transmit an acceptance of the security model to the gateway, otherwise, the server computer can transmit a rejection of the security model to the gateway and the learning process can be repeated in a new learning round. The learning phase is described in more detail below with reference to FIG. 6. As an alternative, the learning process can involve the server computer training a security model itself and sending the model to the gateway for the gateway to use.

The service phase 122, comprising steps 114 and 116, can involve the gateway deploying the security model in order to detect and filter incoming attack packets before they are transmitted to the server computer. Optionally, the server computer can compensate the gateway with service rewards. The server computer can additionally verify that the model has been deployed. Both the gateway and the server computer can contact a third party computer for conflict resolution.

At step 114, the server computer can optionally transmit a learning reward to the gateway for successfully completing the learning process. Additionally, the server computer can perform a deployment verification process in order to determine if the gateway has deployed the security model. The server computer can evaluate network packets received after the gateway has supposedly deployed the security model. If the server computer receives less attack packets, it can determine that the gateway has deployed the security model. If the server computer receives a similar amount of attack packets, the server computer can determine that the gateway has not deployed the security model. Deployment verification can be understood with reference to the corresponding section below and FIG. 8.

At step 116, the server computer can optionally transmit a service reward to the gateway in order to compensate the gateway for deploying the security model. This service reward can be periodically transmitted to the gateway in a number of installments, provided that the gateway deploys the security model. If the server determined that the gateway did not deploy the model at step 114, the server computer can instead perform a conflict resolution process with a third party computer, which may result in a refund of the service reward.

These phases and steps are discussed in greater detail in their corresponding sections and subsections below.

B. System Architecture

Figure 2:
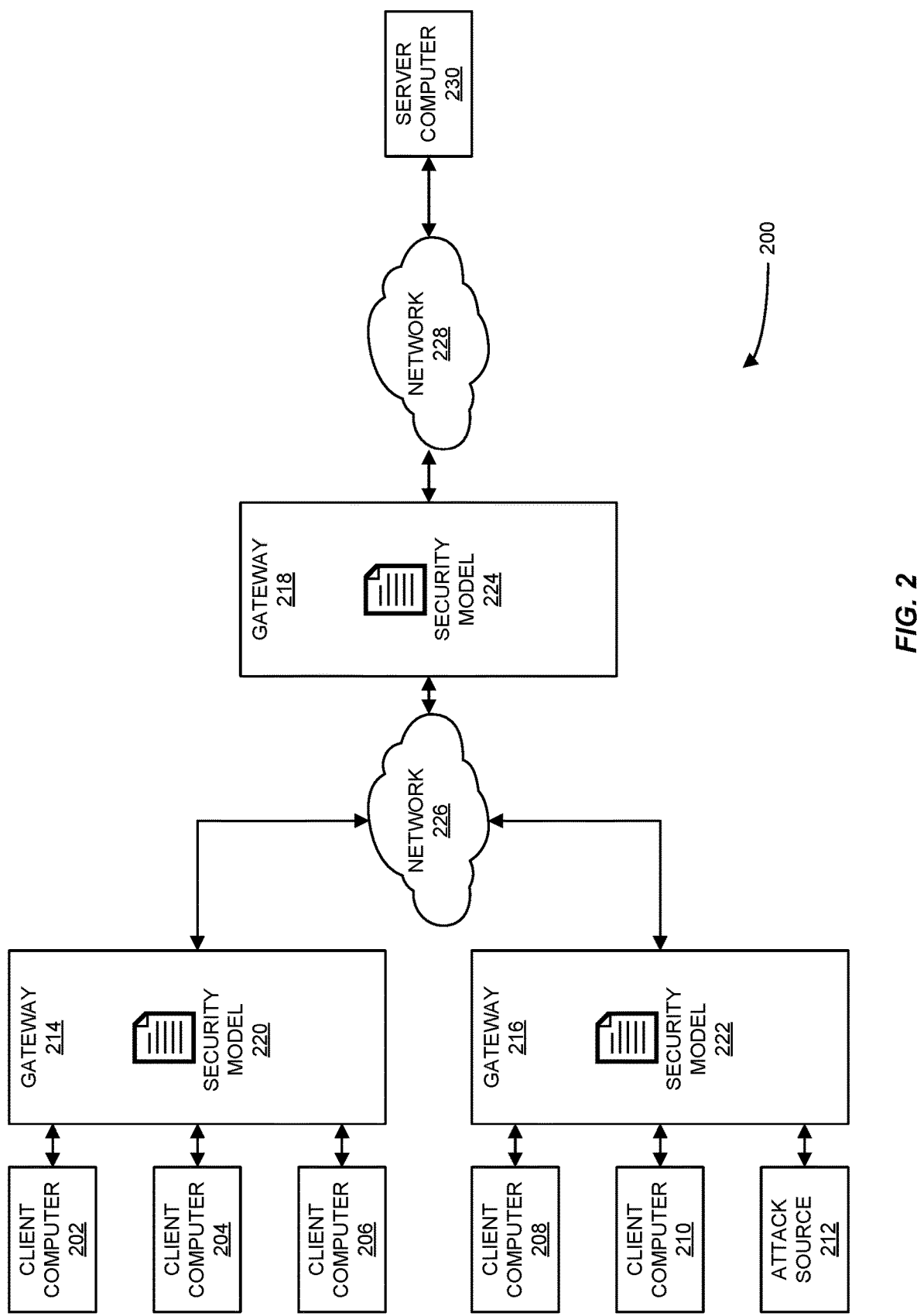
FIG. 2 shows a block diagram of a network comprising a server computer and gateways that can participate in a method to deploy a protocol to a gateway according to some embodiments.

FIG. 2 shows a system block diagram of a network 200 according to some embodiments of the invention. The network 200 is a model or representation of a network architecture in which a server computer 230 and a gateway of gateways 214-218 may perform methods according to some embodiments. The network 200 comprises client computers 202-210, an attack source 212, gateways 214-218, security models 220-224, networks 226-228, and server computer 230.

The client computer 202-210 may be computers associated with legitimate users of a service provided by the server computer 230. As an example, the server computer 230 may be a server that hosts images, and the client computers 202-210 may be operated by users attempting to upload images to the server or view images hosted on the website.

The attack source 212 may be a malicious entity that is sending attack packets to server computer 230. For example, the attack source 212 may be a computer used to perform a denial of service attack on the server computer 230. The denial of service attack may comprise sending a large volume of network packets to server computer 230, in order to prevent the server computer from servicing legitimate service packets sent by client computers 202-210.

Network packets from the client computers 202-210 and from the attack source 212 may be sent to the server computer 230 via any number of gateways 214-218. These gateways may be computers, servers, or other devices that route network traffic over networks such as the Internet. For example, gateway 214 may be associated with an internet service provider (ISP) that allows client computers 202-206 to communicate with other computers connected to the Internet. Each gateway may implement a security filter, such as a firewall, that enables the gateway to control the packets that pass through the gateway. Each gateway may also have a security model that can be used to classify or identify network packets, such as attack packets and service packets. The security model may work in conjunction with the security filter to block identify and block attack packets.

Networks 226-228 may be intermediate computer or device networks that network packets are transmitted through to get to server computer 230. In some cases, networks 226-228 may comprise sub-network of a larger network, i.e., a collection of networked computers in a network such as the Internet. In other cases, networks 226-228 may be independent networks, for example, network 226 may be a local area network and network 228 may be the Internet.

The gateways, client computers, server computer, and attack source can communicate with one another via any appropriate means. Messages and other communications between the gateways, client computers, server computers, and attack sources may be in encrypted or unencrypted form. Messages between the devices and computers may be transmitted using a communication protocol, such as, but not limited to, File Transfer Protocol (FTP); Hypertext Transfer Protocol (HTTP); Secure Hypertext Transfer Protocol (HTTPS), Secure Socket Layer (SSL) and/or the like.

II. Discovery Phase

In the discovery phase, the server computer can determine that it under attack, discovers gateways that might be able to prevent the attack using a security model, preforms a spoof check, determines an initial reward and selects a gateway to perform the learning process with.

A. Attack Detection

In the attack detection step, the server computer can determine that it is under attack by evaluating the network packets it receives. The server computer can classify the received network packets as either attack packets or service packets, and the server computer can determine that it is under attack based on the presence of attack packets among the network packets. In some cases, such as when the volume of network packets is low, the server computer may evaluate all network packets it receives. In others, such as when the volume of network packets is high, the server computer may evaluate a subset of network packets, e.g., every $10^{th}$ network packet. There are numerous ways the server computer can evaluate and classify network packets. As an example, the server computer could use a machine learning model trained on previously received network packets in order to evaluate and classify the received network packets. As another example, the server computer could use a set of static rules to classify the received network packets. As an example of a static rule, the server computer could classify all network packets with a certain source port (e.g., 8000) as attack packets. The server computer may evaluate received network packets using a Network Intrusion Detection System (NIDS) or any other appropriate software or hardware used to analyze network packets.

B. Gateway Discovery

Figure 3:
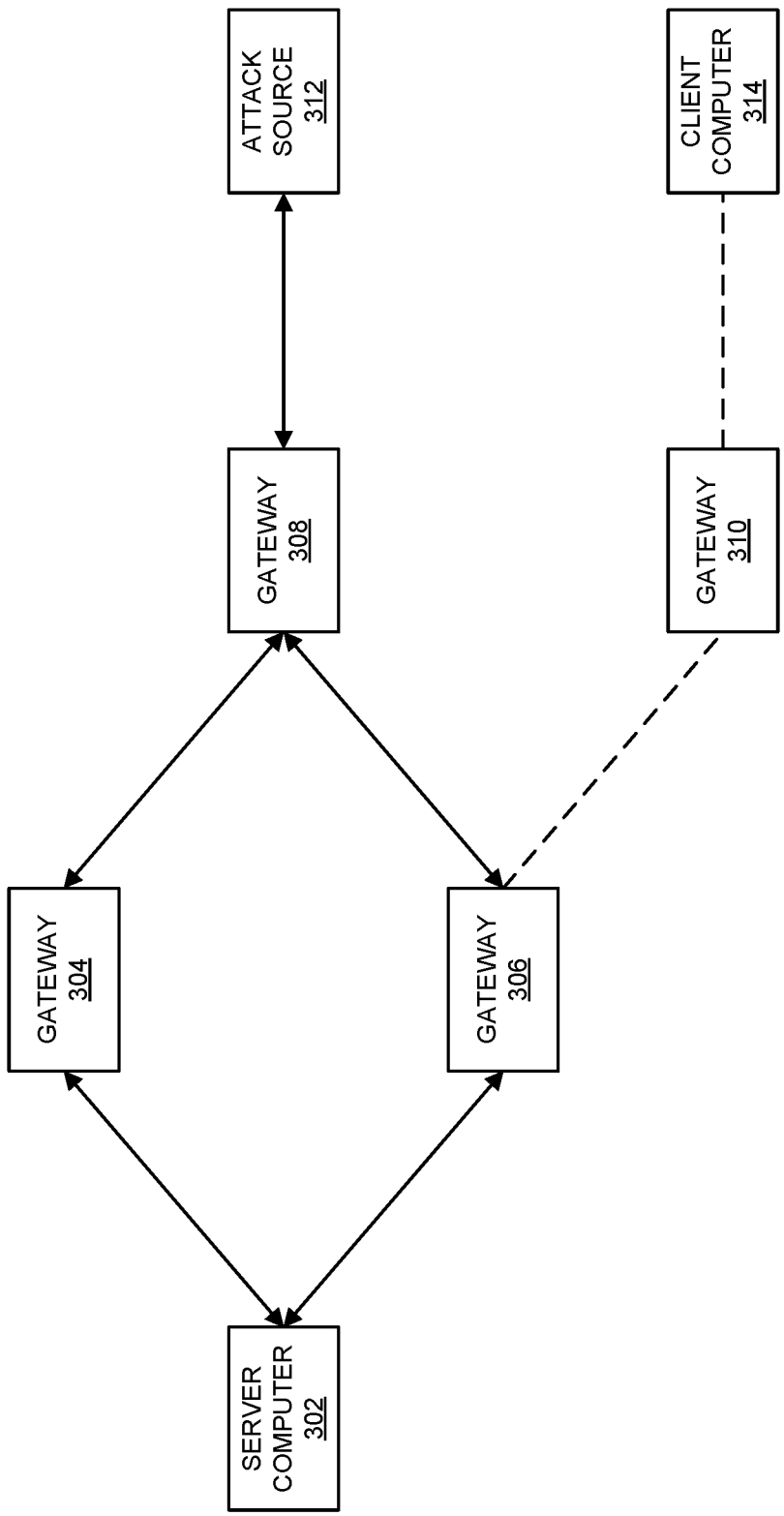
FIG. 3 shows a block diagram of a gateway discovery process according to some embodiments.

In the gateway discovery step, the server computer identifies gateways that are between the server computer and the attack source, i.e., attack packets originating from the attack source can pass through those gateways before reaching the server computer. The server computer can generate a gateway list or Glist comprising a list of the gateways discovered during the gateway discovery step. Later, during the spoof check and initial reward selection steps, the server computer can filter the gateway list to generate a filtered list of gateways or Flist. FIG. 3 shows an example of a network comprising a server computer 302, gateways 304-310, an attack source (or apparent attack source) 312, and a client computer 314.

The server computer 302 can evaluate the attack packets labeled in the attack detection stage in order to identify an apparent attack source 312 or an address of the apparent attack source 312. For example, this can be accomplished by evaluating any source information presented in the attack packets, such as a source IP address. Once the server computer 302 has determined the address of the apparent attack source, server computer 302 can generate and transmit a plurality of DISCOVERY packets to the attack source 312. The server computer 302 can trace these discovery packets in order to identify gateways that are between the server computer 302 and the attack source 312 in the network.

In order to reach the attack source 312, DISCOVERY packets from server computer 302 must pass through gateway 308, and either gateway 304 or gateway 306. As gateway 310 is not on the way to attack source 312, no DISCOVERY packets are sent to gateway 310.

The discovery packets may comprise a request for managed IP ranges corresponding to each gateway. In response to receiving the discovery packets, gateways 304-308 can transmit their managed IP ranges to server computer 302 in a discovery response packets. A managed IP range can contain all IP address that are "behind" the corresponding gateway, i.e., network packets must pass through the gateway on the way to IP addresses in the managed IP range. The server computer 302 can check the IP address of the apparent attack source 312 against each managed IP range in order to verify that the corresponding gateway is a gateway for the apparent attack source.

Additionally, the server computer can use the Internet Control Message Protocol (ICMP) and diagnostic tools such as traceroute to measure the transmit delays of the discovery packets as they are routed between nodes in the network. Additionally, the server computer 302 can determine the latencies to each gateway 304-308 on the path to the apparent attack source 312. The server computer 302 can determine or estimate the distance between the server computer 302 and a gateway based on the corresponding latency. As an example, because a discovery packet travelling to gateway 308 has to first travel through gateways 304 or 306, the latency between server computer 302 and gateway 308 is higher than the latency between server computer 302 and gateway 306, because the network distance between the server computer 302 and gateway 308 is greater than the network distance between server computer 302 and gateway 306.

C. Spoof Checking

In the spoof checking step, the server computer can verify that the attack source has not spoofed its IP address. If the attack source has spoofed its IP address, it is possible that some of the gateways discovered in the gateway discovery phase do not actually route attack packets between the attack source and the server computer. Consequently, there is no reason for the server computer to perform the rest of the discovery phase, learning phase, and service phase with these gateways, as they do not receive any attack packets that need to be filtered. As a result of performing the spoof check, the server computer can produce a smaller, filtered list of gateways, from which it can select a gateway that it can perform the rest of the discovery phase, learning phase, and service phase with.

The spoof checking process generally involves the gateway stamping network packets that it receives before transmitting the network packets to the server computer. The network packets are stamped with a digital stamp, such as a random string of alphanumeric characters. If the attack source is spoofing its IP address, the attack packets will not be transmitted through the gateway, and consequently will not have the stamp. If the server computer receives an attack packet with the stamp, it confirms that the attack packets are actually being routed through the gateway. If the server computer does not receive an attack packet with the stamp, it can determine that the attack packets are not routed through that gateway, and consequently the server computer does not need to perform the learning process with that gateway. Spoof checking may also be used in the deployment verification process described below.

Figure 4:
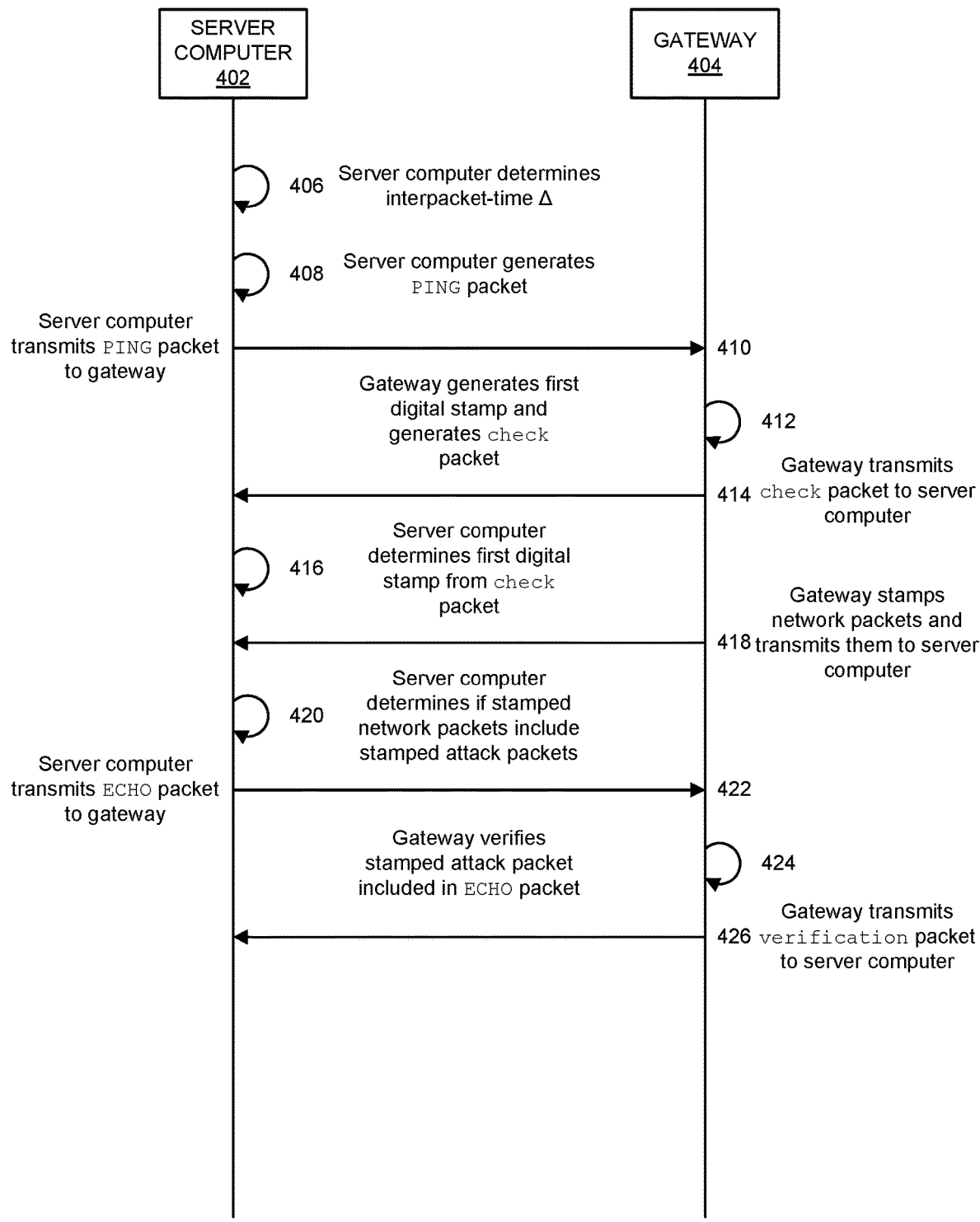
FIG. 4 shows a sequence diagram of a spoof checking process according to some embodiments.

The spoof checking process can be better understood with reference to the sequence diagram of FIG. 4, which shows a spoof check performed by a server computer 402 and a gateway 404.

At step 406, the server computer 402 determines a first inter-packet time corresponding to the plurality of attack packets identified during the attack detection step. The first inter-packet time is the average amount of time that passes between the server computer 402 receiving two consecutive attack packets. The first inter-packet time is indicative of the rate at which the attack packets are received. The server computer 402 can calculate the first inter-packet time via any appropriate means, as an example, the server computer 402 can determine the first inter-packet time based on timestamps corresponding to each attack packet. The difference between the timestamps of consecutive attack packets can be averaged in order to produce the first inter-packet time.

At step 408, the server computer 402 can generate a PING packet, comprising a product of the first inter-packet time and a wait time factor. The wait time factor affects the window of time over which the spoof check takes place. As an example, a wait time factor of 5 means that the spoof-check will be performed over a period of time equal to five times the first inter-packet time ($5\Delta$).

At step 410, the server computer 402 can transmit the PING packet to gateway 404.

At step 412, the gateway 404 can generate a first digital stamp and generate an encrypted CHECK packet comprising the first digital stamp. The first digital stamp can be generated via any suitable means, e.g., randomly, provided that an attacker cannot duplicate the first digital stamp.

At step 414, the gateway 404 can transmit the encrypted CHECK packet to the server computer 402.

At step 416, the server computer 402 can decrypt the encrypted CHECK packet to determine the first digital stamp. The server computer 402 can compare this first digital stamp to stamped packets subsequently received by the server computer 402, in order to determine if those network packets were transmitted to server computer 402 via gateway 404.

Over the period of time equal to the product of the first inter-packet time and the wait time factor, the gateway 404 can receive network packets from computers and entities over the Internet. The gateway 404 can stamp network packets that are directed to the server computer 402 using the first digital stamp before forwarding the stamped network packets to the server computer 402 at step 418.

At step 420 the server computer 402 can evaluate the stamped network packets to determine if the stamped network packets include any stamped attack packets. Further, the server computer 402 can verify that the digital stamp on the stamped network packets matches the first digital stamp received in the CHECK packet from gateway 404. Provided that an attack source is unable to replicate the first digital stamp, the presence of a stamped attack packet indicates that some attack packets are reaching the server computer 402 via gateway 404, indicating that those attack packets are not spoofed.

At step 422, if the server computer 402 identified any stamped attack packets, the server computer can generate and transmit an ECHO packet to gateway 404. The ECHO packet can comprise one of the stamped attack packets received from the gateway 404.

At step 424 the gateway can verify that the stamped attack packet received in the ECHO packet was transmitted to the server computer 402 from the gateway 404.

At step 426 the gateway 404 can transmit a VERIFICATION packet to the server computer 402, in order to confirm that the stamped attack packet was transmitted to the server computer 402 via gateway 404. The server computer 402 can include the gateway 404 in the filtered gateway list upon receiving the verification packet. The spoof checking procedure can be performed with each gateway in the gateway list, and the gateways corresponding to non-spoofed attack packets can be included in the filtered gateway list.

D. Initial Reward Selection

Figure 5:
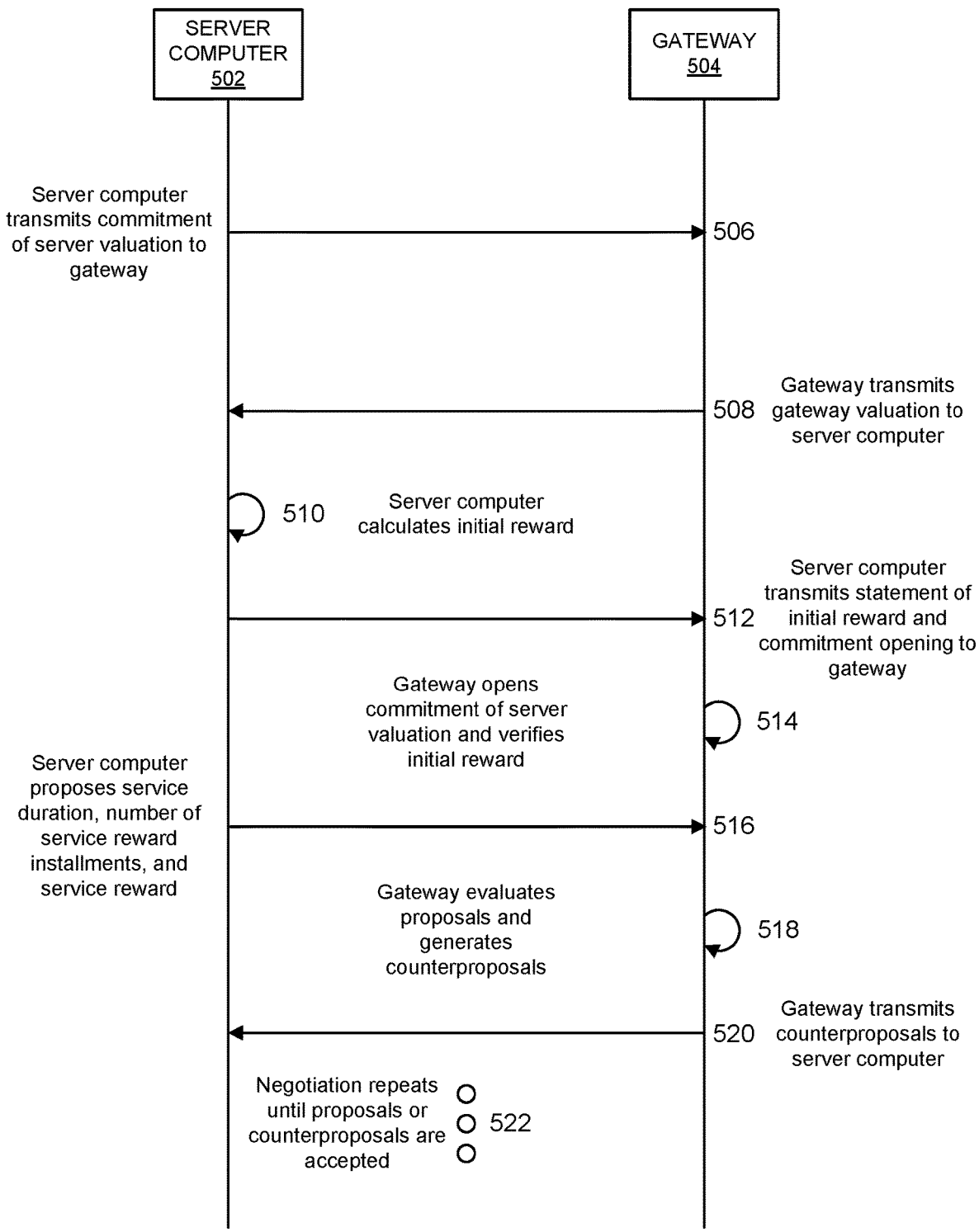
FIG. 5 shows a sequence diagram of an initial reward selection process according to some embodiments.

The optional initial reward selection process involves the server computer and a gateway determining the value of an initial reward $\rho_1$, as well as other parameters, such as a service duration $\Gamma_{service}$, a number of service reward installments $\tau$, and the service reward (sometimes referred to as "fee"). In some embodiments that make use of a reward system, the initial reward can be used to calculate the learning reward, which can be transmitted to the gateway on successfully completing the learning process. The service duration, number of service reward installments, and fee relate to the reward given to the gateway for deploying the security model. FIG. 5 shows a sequence diagram of an initial reward selection process according to some embodiments.

At step 506, the server computer 502 can transmit a packet comprising a commitment of the server valuation (COMMIT($v_s$)) to the gateway 504. The server valuation is the server computer's 502 estimate of the maximum appropriate value of the initial reward. The commitment of the server valuation can later be used by the gateway 504 in order to verify that the server computer 502 did not cheat the gateway 504 during the reward selection process. In order to reduce the number of communications between server computer 502 and gateway 504, the commitment of the server valuation can be included in the ECHO packet sent during the spoof checking process.

At step 508, the gateway 504 can transmit the gateway valuation $v_G$ to the server computer 502. The gateway valuation is the gateway's 504 estimate of the minimum appropriate value of the initial reward, and can be used by the server computer 502 in order to determine the initial reward. In order to reduce the number of communications between the server computer 502 and gateway 504, the gateway valuation can be included in the VERIFICATION packet sent during the spoof checking process.

At step 510, the server computer 502 can set the initial reward as the minimum of the gateway valuation and the server valuation. This ensures that the server computer 502 produces the minimum possible initial reward. In some embodiments, if the gateway valuation exceeds the server valuation, the server computer 502 and gateway 504 may not perform the learning phase, because the server computer 502 is unwilling to accept an initial reward higher than the server valuation and the gateway 504 is unwilling to accept an initial reward lower than the gateway valuation. In this case, the server computer 502 can terminate the initial reward selection process with the gateway 504 and begin the initial reward selection process with a different gateway from the filtered list (FList) of gateways. Additionally, the server computer 502 can remove the gateway 504 from the filtered list.

At step 512, if the server computer 502 calculated the initial reward as the minimum of the gateway valuation and the server valuation, the server computer 502 can transmit the initial reward and a commitment opening (OPEN($v_s$)) to the gateway 504. The commitment opening can be used by the gateway 504 in order to open the commitment sent at step 506 and verify the server valuation $v_s$.

At step 514, the gateway 504 can use the commitment opening to open the commitment of the server valuation. The gateway 504 now knows the server valuation, the gateway valuation, and the initial reward. The gateway 504 can confirm that the initial reward was correctly calculated by determining the minimum of the server valuation and the gateway valuation. If the server computer 502 incorrectly calculated the initial reward, the gateway 504 can update a gateway log to include a BREACH string, indicating that the server computer 502 breached the initial reward selection protocol. The gateway 504 can transmit the gateway log to a trusted third party computer as part of a conflict resolution process.

At step 516-520, the server computer 502 and gateway 504 can negotiate the value of the service duration $\Gamma_{service}$, the number of service reward installments τ, and the service reward "fee." The service duration is the amount of time that the gateway 504 will deploy the security model, provided that the server computer 502 completes the discovery phase and service phase with the gateway 504. The number of service installments is the number of times that the server computer 502 will pay the gateway 504 the service reward, and the service reward is the amount that the server computer 502 will reward to the gateway 504. The negotiation process can take a number of different forms. Steps 516-520 are intended only as a non-limiting example of one method of performing this negotiation.

At step 516 the server computer 502 can transmit proposal values corresponding to the service duration, the number of service installments, and the service reward. These proposal values can correspond to the preferred length of the service duration, the preferred number of service installments and the preferred service reward. These values may be calculated or estimated in advanced or during the initial reward selection process. The server computer 502 may determine these proposal values based on the analysis provided in the analysis section below.

At step 518 the gateway 504 can evaluate the proposal values and determine if the proposal values are acceptable. If the proposal values are not acceptable to gateway 504, the gateway 504 can generate its own set of counterproposal values.

At step 520, the gateway 504 can transmit an acceptance of the proposal values, or its counterproposal values to server computer 502. The server computer 502 can evaluate these counterproposal values and determine if they are acceptable. Steps 516-520 can be continued until the server computer 502 and gateway 504 agree on the values of the service duration, the number of service reward installments, and the service reward, or until the server computer 502 or gateway 504 terminate the initial reward selection process, as indicated by ellipsis 522. For example, the server computer 502 may terminate the initial reward selection process if a gateway counter-proposal is greater than the maximum values, or less than the minimum values that the server computer 502 is willing to accept for the service duration, the number of service installments, and the service reward. In this case, the server computer 502 can terminate the initial reward selection process with the gateway 504 and begin the initial reward selection process with a different gateway from the filtered list (FList) of gateways. Additionally, the server computer 502 can remove the gateway 504 from the filtered list.

The server computer 502 can perform the initial reward selection with a number of gateways, then select one of the gateways to perform the learning phase and service phase with. For example, the server computer 502 may select a gateway for which the initial reward selection produced the most favorable parameters for the server computer 502 (e.g., the least initial reward, the lowest server reward, the longest service time duration, the lowest number of installments, etc.)

It should be understood that the initial reward selection process is optional. Some embodiments of the invention may not involve transmitting learning rewards and service rewards to the gateway 504, and consequently the server computer 502 and gateway 504 may not perform the initial reward selection process.

E. Gateway Selection

There are a number of ways in which a gateway can be selected from the filtered list (Flist) of gateways. As one example, the server computer can select a gateway uniformly and randomly from the filtered list of gateways. As another example, the server computer can select a gateway based on its corresponding latency. As the latency corresponds to the network distance between the server computer and the gateway, the server computer can select a gateway with the greatest corresponding latency in order to select a gateway farther from the server and closer to the attack source. The server computer can sort the filtered list of gateways in descending latency order and select the first gateway in the filtered list.

As another example, the server computer can perform a gateway selection process that minimizes the probability that a malicious gateway that is colluding with the attack source is selected. The server computer can randomly select a constant number of gateways g>0 from the filtered list of gateways, where the selection probability for a given gateway is proportional to the latency between that gateway and the server computer (i.e., gateways with higher latency are selected with greater probability). From these g gateways, the server computer can select the gateway that produced the lowest initial reward, breaking ties uniformly and randomly.

Further, the server computer may select a gateway with the least corresponding initial reward, the lowest service reward, the longest service time duration, or the lowest number of installments.

III. Learning Phase

In the learning phase, the server computer can perform a learning process with the selected gateway in order to train the selected gateway's security model. The learning process can comprise a number of learning rounds. In each learning round, the server computer can transmit a set of labeled training packets and a set of unlabeled test packets to the gateway. The gateway can use the labeled training packets to train the security model and can use the trained security model to produce a set of test classifications (e.g., "attack packet" or "service packet") corresponding to the set of unlabeled test packets. The gateway can transmit the test classifications to the server computer, which can determine an accuracy value based on the proportion of correct classifications. If the accuracy value exceeds an accuracy threshold, the server computer can transmit an acceptance of the security model to the gateway. Optionally, in some embodiments, the server computer may also transmit a learning reward to the gateway for successfully completing the learning process. If the accuracy value does not exceed the predetermined accuracy threshold, the server computer and gateway can perform a subsequent round of the learning process with new labeled training packets and unlabeled test packets. This learning process can be repeated until either the accuracy value exceeds the accuracy threshold or the server computer determines that the gateway has failed the learning process, in which case the server computer can terminate the learning process, return to the discovery phase, select a new gateway, and perform the learning process again with that gateway.

A. Determining Round Count and Reward Amount

The learning process can proceed for a variable number of learning rounds, and there are numerous methods by which the total number of rounds can be determined. As one example, the server computer can use a static, predetermined limit on the maximum number of rounds, $r_{max}$. This static limit could be based on any number of factors. As an example, as shown in the "Empirical Study" section below, gateways were trained to near 100% classification accuracy in three learning rounds on average, thus $r_{max}$ could be set to three rounds. If $r_{max}$ is three rounds, the server computer and the gateway can perform the learning process until the accuracy value exceeds the predetermined accuracy threshold or the round index (i.e., a number corresponding to the current learning round) exceeds $r_{max}$, in which case the server computer can terminate the learning process with the gateway.

As another example, the server computer can evaluate when to terminate the learning process based on a threshold such as a utility threshold. The server computer can calculate a utility value that states indicating the value of the trained security model to the gateway based on a difference between the effectiveness of the service model and the learning reward transmitted to the gateway.

Definition 1. For a given tolerance $\tau \in \mathbb{R}$ and parameters $\alpha, \beta > 0$, we say that the server computer is $(\alpha, \beta, \tau)$-rational if it weighs the accuracy of attack prevention and the amount of reward paid by $\alpha$ and $\beta$ respectively, up to a threshold of $\tau$. This is achieved by modeling the utility function for the server as $U_S = \alpha a - \beta R$, where a is the accuracy of the security model learned by the gateway, and R is the total reward the server pays the gateway for learning.

As stated in definition 1, The server computer's utility function can be modeled as $U_S = \alpha a - \beta R$, where $U_S$ is the server computer's utility value, a is the classification accuracy, R is the value of the learning reward, $\alpha$ is a classification accuracy weight and $\beta$ is the learning reward weight. The server computer may assume that the classification accuracy translates directly or nearly directly to attack prevention, e.g., if the classification accuracy a is 80%, the server computer may assume that the security model, once deployed, will filter 80% of incoming attack packets, thus the classification accuracy can be used as a prediction of the rate of attack prevention.

The server computer can calculate the utility value in each round r and compare it to a utility threshold $\tau_r$, corresponding to that round. The utility threshold may be a predetermined utility threshold. If the utility threshold exceeds the utility threshold, but the gateway does not achieve the desired accuracy threshold, the server computer can continue the learning process on a subsequent round. If the utility function does not exceed the utility threshold, then it is no longer valuable for the server computer to complete the learning process, because the value of the learning reward exceeds the value of preventing the attack. In this case the server computer can terminate the learning protocol.

In each round, the server computer can determine the accuracy value $a_r$, corresponding to the proportion of correctly classified test packets from that round. The server computer can also calculate the learning reward $R_r$ (i.e., the total reward the gateway would receive if the accuracy value $a_r$ exceeds the accuracy threshold). There are numerous ways by which the learning reward can be calculated. As one example, the server computer can first calculate a relative reward $\rho_j = \rho_{j-1}(1+(a_j - a_{j-1}))$ in round i≤r and for 2≤j≤r, where $\rho_1$ is the initial reward determined during the initial reward selection process, $\rho_{j-1}$ is a previous reward value, and $a_{j-1}$ is a previous accuracy value. Then the server computer can calculate the reward $R_r = \rho_r \Sigma_{i \le r}(n_i/e)$, where $n_i$ is the number of training and testing packets sent by the server to the gateway in round i. Using the calculated learning reward $R_r$, and the accuracy value $a_r$, determined based on the proportion of correct classifications, the server computer can determine the utility value $U_{S,r}$ corresponding to round r. If the utility function exceeds the utility threshold $\tau_r$, the server computer can proceed to a subsequent learning round, if the utility function does not exceed the utility threshold, the server computer can terminate the learning process.

B. Learning Process

Figure 6:
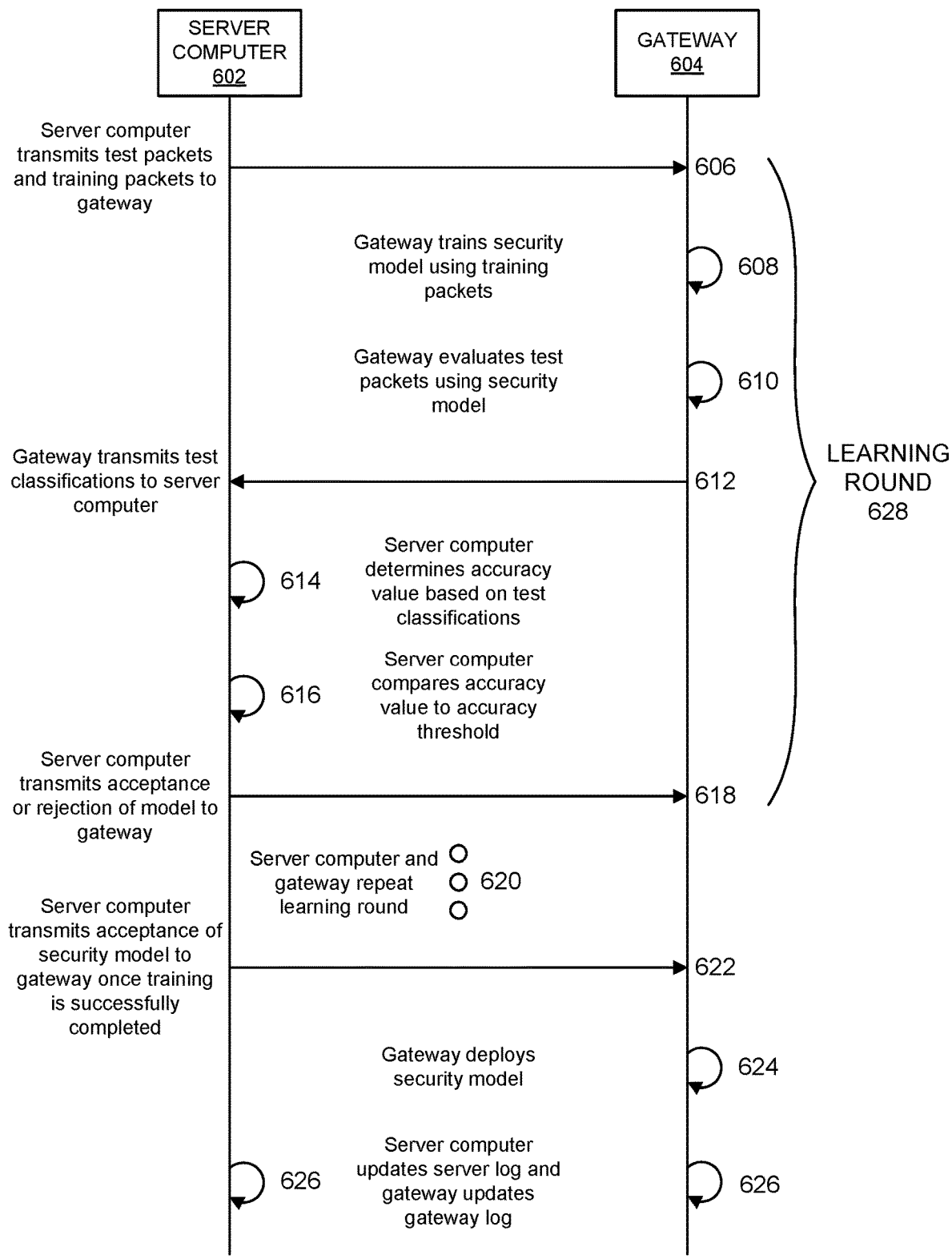
FIG. 6 shows a sequence diagram of a learning process according to some embodiments.

In some embodiments, the learning process can comprise the server computer training a security model using received attack packets and service packets, then transmitting the learning model to a server computer. In other embodiments, the learning process can comprise a number of learning rounds. In each learning round, the server computer can send a set of training packets and a set of test packets to the gateway in order to train and test the security model respectively. Once the security model is adequately trained, the gateway can deploy the security model and can optionally be compensated with a learning reward. FIG. 6 shows a sequence diagram of an exemplary learning process according to some embodiments.

Learning round 628 comprises steps 606-618. The server computer 602 and gateway 604 can repeat these steps for each learning round performed during the learning process, up until the security model is adequately trained or the learning process is terminated. Ellipsis 620 indicates this repetition.

At step 606, the server computer 602 can transmit training packets and test packets to gateway 604. These training packets and test packets can be selected from among network packets received by the server computer 602 over some period of time. The training packets can be labeled by server computer 602, e.g., during the attack detection step. Labeled training packets allow the gateway 604 to train a supervised security model using the training packets. The test packets may be unlabeled, and testing the security model may involve the security model labeling or classifying these attack packets. If the learning round is not the first learning round (i.e., there were one or more previous learning rounds), the training packets may include labeled test packets from a previous learning round.

The server computer 602 may select the training packets and test packets randomly or using any other appropriate method. For example, the server computer 602 may randomly select 1000 labeled attack packets and 1000 labeled service packets from the received network packets to use as training data. Labeled and unlabeled network packets may be stored in a network packet database managed by the server computer 602.

At step 608, the gateway 604 can train the security model using the training packets. The security model may be a machine learning model, such as a support vector machine, logistic regression model, etc., which may learn to classify network packets as one of two classifications (i.e., attack packets and service packets) based on characteristic features of attack packets and service packets. For example, the gateway 604 may use information contained in the packet header, trailer, or payload as features in order to train the learning model, such as the source IP address, time to live values, number of hops, etc.

At step 610, the gateway 604 can use the security model to evaluate the test packets and produce a set of test classifications. The security model 604 may classify test packets based on their similarity to training packets used to train the model. For example, if all labeled attack packets have a given source IP address, the security model may learn that all packets from that source are attack packets. If the security model receives an unlabeled test packet originating from that address, the security model may classify that unlabeled test packet as an attack packet. The gateway 604 may generate a set of test classifications comprising the classifications corresponding to each received test packet.

At step 612 the gateway 604 can transmit the set of test classifications to the server computer 602, in order for the server computer 602 to evaluate the test packets and determine the classification accuracy.

At step 614, the server computer 602 can determine an accuracy value based on a proportion of accurate classifications from the set of test classifications. The server computer 602 can determine the proportion of accurate classifications by generating its own set of test classifications corresponding to the set of test packets. The proportion of accurate classifications can be determined as the proportion of classifications that match between the set of test classifications produced by the server computer 602 and the test classifications produced by the gateway 604.

At step 614, the server computer 602 can additionally determine whether the accuracy value is greater than an accuracy threshold. The accuracy threshold may be predetermined by the server computer 602, based on the server computer's attack prevention needs. For example, if the server computer 602 is providing some critical service, the accuracy threshold may be comparatively high (e.g., 95%, 99%), while if the server computer 602 is providing a non-critical service, the accuracy threshold may be comparatively low (e.g., 60%, 70%). If the accuracy value is greater than the predetermined threshold, the security model is adequately trained and is ready for deployment.

At step 616, if the accuracy value does not exceed the accuracy threshold, the server computer 602 can determine whether it should proceed to a subsequent learning round of the learning process or terminate the learning process, using any of the methods described above or any other appropriate method. As one example, the server computer 602 can determine a round index corresponding to the current round. The server computer 602 can maintain or use a counter for this purpose, incrementing the counter each time a new learning round begins. The server computer 602 can compare the round index to a maximum number of learning rounds. If the round index is greater than the maximum number of learning rounds, the server computer 602 can terminate the learning process.

Alternatively, the server computer 602 can periodically evaluate an elapsed time corresponding to the learning process. If the learning process takes longer than a predetermined amount of time (e.g., 10 minutes) the server computer 602 can terminate the learning process. The server computer 602 can compare the elapsed time to a time threshold in order to determine whether to terminate the learning process.

As another example, the server computer 602 can calculate a utility value and perform a subsequent learning round provided the utility value exceeds a utility threshold. The utility value can be proportional to the value of the service received from a gateway deploying the model against the cost of deploying the model.

At step 618, the server computer 602 can transmit an acceptance or rejection of the security model to the gateway 604, depending on whether the accuracy value corresponding to the security model was greater than the accuracy threshold. If the accuracy value was less than the accuracy threshold, the server computer 602 can transmit a rejection of the security model to the gateway 604.

If the security model is rejected and the learning process is not terminated, the server computer 602 and gateway 604 can engage in subsequent learning rounds, until either the security model is accepted or the learning process is terminated. Ellipsis 620 indicate repetition of the learning process.

At step 622, if the accuracy value eventually exceeds the accuracy threshold, the server computer 602 can transmit an acceptance of the security model to gateway 604. This acceptance of the security model indicates to gateway 604 that the learning process is complete, that gateway 604 can deploy the security model, and that gateway 604 will soon receive a learning reward for completing the learning process.

At step 624, upon receiving the acceptance of the security model, the gateway 604 can deploy the security model in order to detect and block attack packets directed at the server computer 602. The gateway 604 can deploy the security model by interfacing the security model with a firewall or another security filter. When a network packet is received by the gateway 604, the gateway 604 can hold the network packet in a buffer or another form of memory while it classifies it using the security model. If the security model classifies the network packet as a service packet, the gateway 604 can forward the network packet to the server computer 602. If the security model classifies the network packet as an attack packet, the gateway 604 can clear the network packet from the buffer or memory, effectively blocking the network packet.

At step 626, the server computer 602 and gateway 604 can update a server log and gateway log respectively. The server computer 602 can include communication records corresponding to the communications between the server computer 602 and the gateway 604, along with the results of the learning process. The gateway 604 can include similar records and results in the gateway log. These logs may be used as part of a conflict resolution process in the event that either the server computer 602 or the gateway 604 breaches protocol.

C. Learning Process Termination

In some cases, the learning process may not be completed successfully. As an example, the server computer may terminate the learning process if a maximum number of rounds is reached. As another example, the learning process may be terminated if the server computer take too long to learn the security model, e.g., requiring more than 10 minutes to train the model. As another example, the learning process may be terminated if the connection between the server computer and the gateway times out.

If the learning process is not completed successfully, the server computer can return to the discovery phase and repeat the gateway selection step. The server computer can select a new gateway to perform the learning phase and service phase with. In some embodiments, the server computer may select a previously unselected gateway from the plurality of gateways, i.e., a gateway that has not already failed the learning process with the server computer. The server computer can repeat this process until a gateway successfully completes the learning process or all gateways have been selected by the server computer, in which case the server computer may stop attempting to deploy a security model at a gateway. For example, if the server computer is selecting gateways based on latency, the server computer can start with the gateway with the highest corresponding latency, then select the gateway with the second highest latency if the learning process terminates, etc.

IV. Service Phase

A. Deployment Verification

Generally, the deployment verification process involves the server computer determining if the gateway deployed the security model into its firewall. If the gateway deployed the security model, the server computer expects to receive attack packets at a lower rate than before the model is deployed. The attack packet rate is proportional to the inverse of the average inter-packet time, i.e., the average of the time difference between consecutive attack packets. If the attack packet rate is reduced as a result of the gateway deploying the security model, the average inter-packet time should increase. Consequently, the server computer can evaluate inter-packet times before and after the security model is deployed in order to confirm the deployment. The server computer can further perform a spoof check to determine if the attack packets are originating from an attack source that is not behind the gateway, and instead only appear to originate from behind the gateway.

Figure 7:
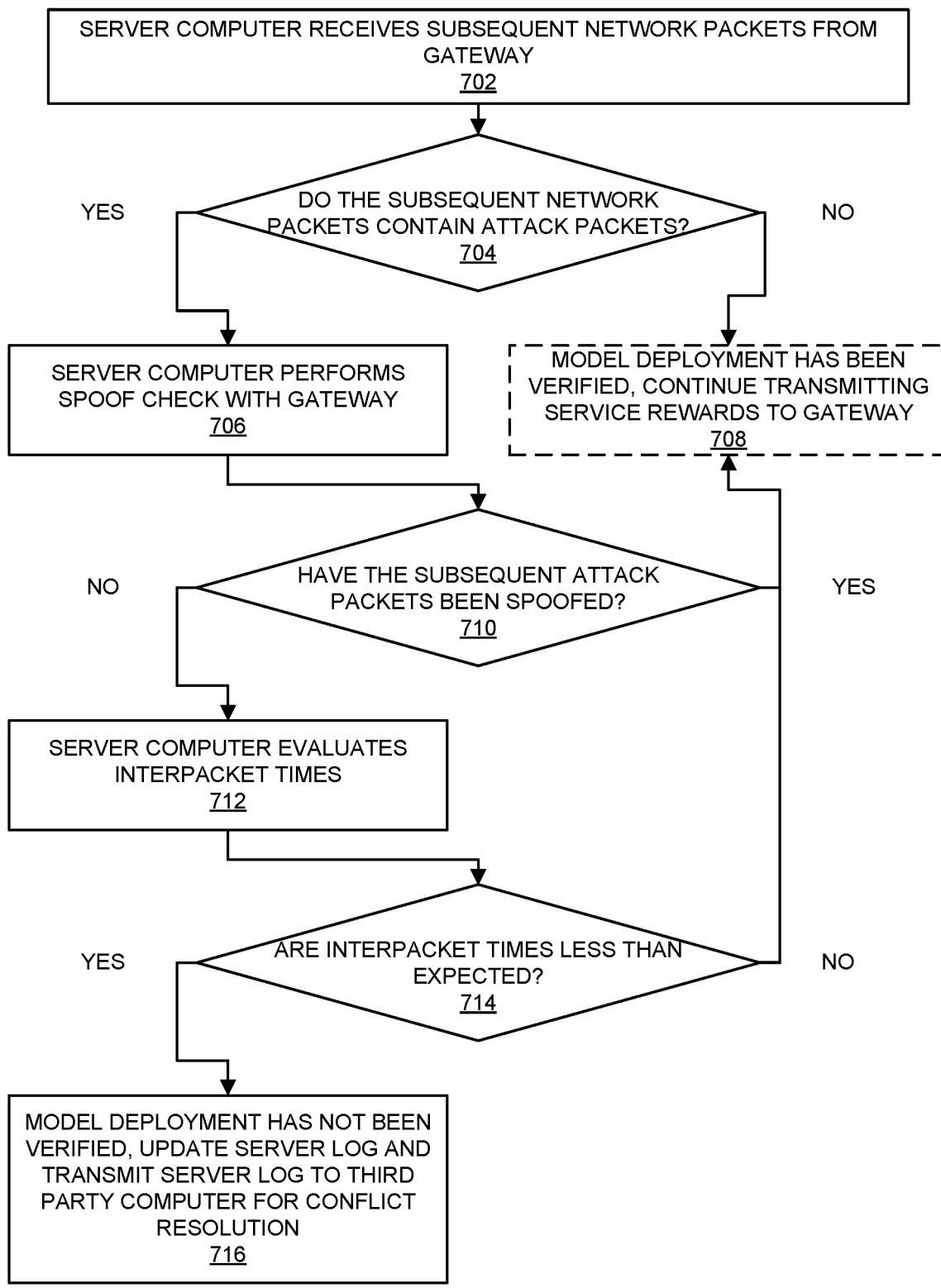
FIG. 7 shows a sequence diagram of a deployment verification process according to some embodiments.

FIG. 7 shows a flowchart detailing a deployment verification process according to some embodiments.

At step 702, the server computer receives a plurality of subsequent network packets from the gateway. This plurality of subsequent network packets refers to network packets received from the gateway after the gateway supposedly deployed the security model. As such, these network packets should have been filtered by the gateway, and as a result should comprise less attack packets.

At step 704, the server computer evaluates the subsequent network packets to determine if they include any subsequent attack packets. The server computer can use any appropriate method or technique as described above. For example, the server computer may use a machine learning model in order to classify the subsequently received network packets as service packets and attack packets. If the subsequently received network packets include attack packets, the server computer proceeds to step 706, otherwise the server computer proceeds to step 708.

At step 706, the server computer performs a spoof check with the gateway in order to determine if the source IP addresses corresponding to the attack packets have been spoofed. This spoof check can be completed in substantially the same way as described in the discovery phase section. The server computer can transmit a PING packet to the gateway, and the gateway can generate a first digital stamp and use the first digital stamp to stamp received network packets. A stamped network packet can comprise a network packet with the digital stamp included in the payload. Provided that an attack source is unable to copy the stamp, the presence of the first digital stamp indicates that the network packet did pass through the gateway at some time. The server computer can then evaluate whether stamped network packets received from the gateway include stamped attack packets. If the stamped network packets include stamped attack packets, the attack source is not spoofing its IP address and the attack packets are flowing through the gateway. If the server computer is still receiving attack packets that are unstamped, it means the attack source is spoofing its IP address.

At step 708 the server computer concludes that the gateway has correctly deployed the security model. This server computer may reach step 708 if the subsequent network packets do not include attack packets, if the attack packets have been spoofed, or if attack packets are received, but no more than what would be expected given the classification accuracy or error of the security model At step 710 the server computer evaluates the results of the spoof check. If the attack packets are not spoofed, the server computer proceeds to step 712. If the attack packets are spoofed, the attack packets are not coming from the gateway and the server computer proceeds to step 708.

At step 712 the server computer evaluates inter-packet times to determine how well the security model is performing. The server computer can determine a first inter-packet time $\Delta_1$ corresponding to attack packets received before the security model was deployed. The first inter-packet time can be calculated by determining amounts of time between consecutive attack packets and averaging those amounts of time. The server computer can also determine a second inter-packet time $\Delta_2$ corresponding to attack packets received after the security model is deployed, in substantially the same way. If the security model has an error tolerance $\varepsilon$ (e.g., 10%), the security model can be expected to miss roughly 10% of attack packets and block the remaining 90% of attack packets. Consequently, as less attack packets are received over the same time interval, the second inter-packet time should be longer than the first inter-packet time by a factor of $\varepsilon$. The server computer can evaluate the inequality $\Delta_2 \geq \Delta_1/\varepsilon$. If the inequality is true, the security model is performing as well or better than expected. If the inequality is false, the security model is performing worse than expected.

At step 714, the server computer can determine if the second inter-packet time is less than expected. If the second inter-packet time is less than expected, the security model's performance is worse than expected, and the server computer proceeds to step 716. If the inter-packet times are not less than expected, the security model is performing as well or better than expected, and the server computer proceeds the step 708.

At step 716 the server computer determines that the security model has not been successfully deployed at the gateway. As such, the server computer updates its server log to include a BREACH string, indicating that the gateway has breached the deployment protocol. The server computer can transmit the server log to a trusted third party computer in order for the third party computer to perform conflict resolution.

B. Conflict Resolution

Both the server computer or the gateway can initiate a conflict resolution process, if the server computer or the gateway determines that a protocol according to some embodiments has been breached in some way. As an example, the server computer may determine that protocol has been breached if the gateway does not deploy the security model or appears not to deploy the security model. As another example, in some embodiments, the gateway may determine that protocol has been breached if the gateway does not received the promised learning reward or the server fails to provide a periodic service reward.

The server computer and the gateway can store and maintain a server log and gateway log respectively. These logs can contain information or records of communications corresponding to the discovery phase, learning phase, and service phase. These information or records may be used to verify that the server computer and the gateway are performing these phases correctly. As an example, the gateway may record the statement of the initial reward received during the initial reward selection process, the values of other negotiated parameters, the value of the learning reward, each of the service rewards received, etc.

If either the server computer or the gateway determines that protocol has been breached, the server computer or gateway can include a BREACH string indicating the breach. The BREACH string indicates to a trusted third party computer that a breach may have occurred and that conflict resolution should take place.

The trusted third party computer may comprise a computer operated by a third party that is trusted by both the server computer and the gateway. The trusted third party computer may be operated by an entity that administers or otherwise manages methods according to some embodiments, e.g., an entity that provisions software modules to the server computer and gateway that may be used to perform the discovery phase, learning phase, and service phase. The trusted third party computer may also be a computer that manages the payment or issuance of rewards to the gateway from the server computer.

When the trusted third party computer receives a log containing the BREACH string from either the server computer or the gateway, the trusted third party computer may request the other log from the other participant. The trusted third party computer may parse through both logs to evaluate if the protocol was followed correctly. The trusted third party computer may run a mock-initial reward selection process and learning phase in order to confirm if the information in the server log and gateway log results from correct operation of the protocol. If the trusted third party computer identifies that a breach has occurred, the trusted third party computer can take appropriate action. As an example, if the trusted third party determines that the gateway did not correctly deploy the security model, it may request a service reward refund from the gateway to the server computer.

C. Gateway Compensation

Figure 8:
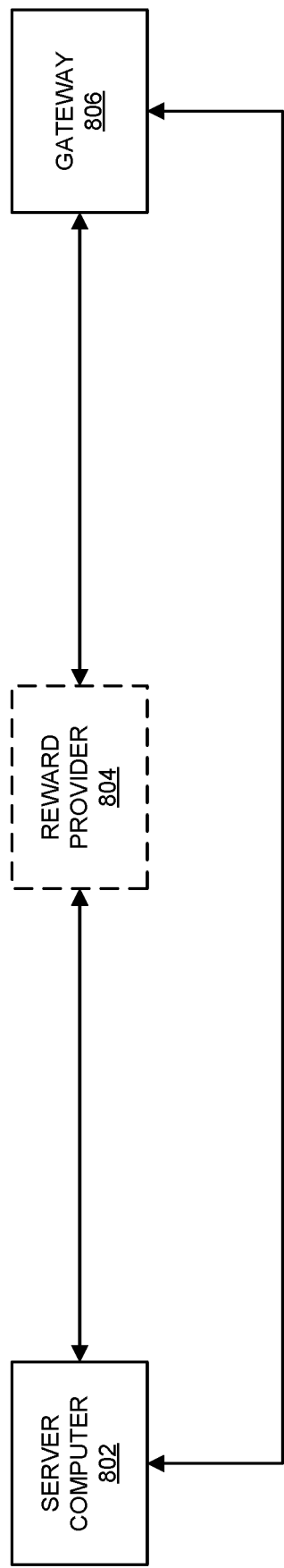
FIG. 8 shows a block diagram of a reward processing system according to some embodiments.

In some embodiments, the server computer may optionally transmit a learning reward and/or periodically transmit service rewards to the gateway. FIG. 8 shows a system block diagram of a reward processing system that can be used to transmit rewards from server computer 802 to gateway 806 via a reward provider 804. The learning rewards and service rewards may be monetary, and may be transmitted via a reward provider 804. In some embodiments, the reward provider 804 may be the trusted third party computer as described above. Alternatively, the reward provider 804 may be an entity that manages a system that can be used to transmit resources (like rewards) from one party to another, e.g., a payment processing network. Further, rewards can be transmitted using any other appropriate digital payment protocol, such as Visa Checkout. As another alternative, learning and service rewards can be transmitted directly from server computer 802 to gateway 806. As an example, server computer 802 may hold some amount of blockchain-based cryptocurrency (e.g., bitcoins). Server computer 802 may generate a transaction transmitting the appropriate amount of cryptocurrency from an address (e.g., a bitcoin address) associated with the server computer 802 to an address associated with gateway 806.

V. Server Computer

Figure 9:
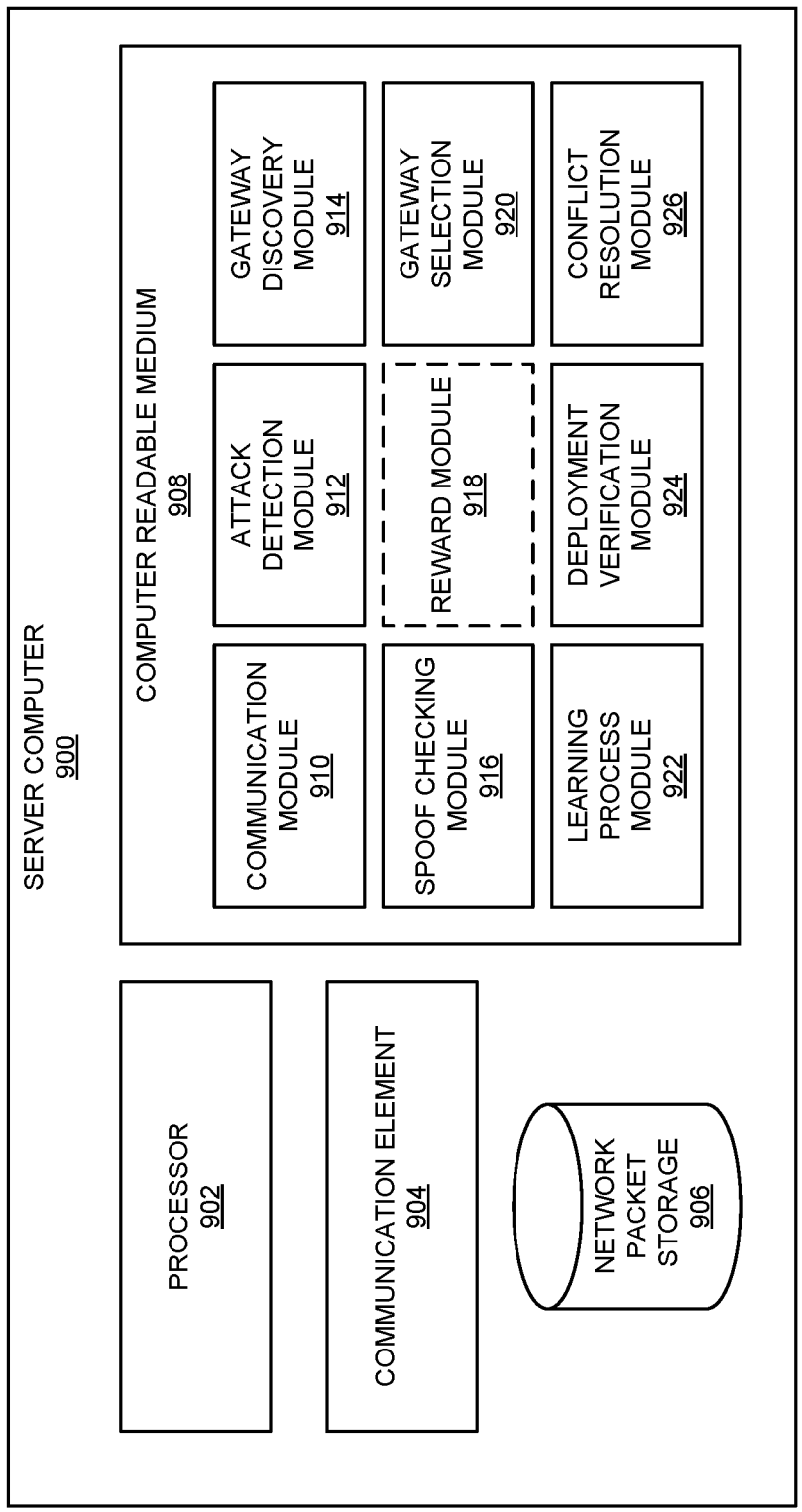
FIG. 9 shows a block diagram of a server computer according to some embodiments.

FIG. 9 shows a block diagram of a server computer 900 according to some embodiments of the invention. The server computer 900 may comprise a processor 902, a communication element 904, a network packet storage database 906, and a computer readable medium 908. The computer readable medium 908 may store a number of software modules, executable by the processor 902 to perform different phases, steps, or processes of the methods according to some embodiments. These software modules may include a communication module 910, an attack detection module 912, a gateway discovery module 914, a spoof checking module 916, a reward module 918, a gateway selection module 920, a learning process module 922, a deployment verification module 924, and a conflict resolution module 926.

The processor 902 may be any suitable processing apparatus or device as described above. The communications element 904 may comprise a network interface that enables the server computer 900 to communicate with other computers or systems over a network such as the Internet. The network packet storage database 906 may be used by server computer 900 to stored labeled or unlabeled network packets.

The communication module 910 may comprise code, executable by the processor 902 to generate messages, reformat messages, and/or otherwise communicate with other entities or computers. This may include sending and receiving packets such as PING packets, DISCOVERY packets, CHECK packets, ECHO packets, sets of training packets, sets of testing packets, etc. as described above. The communication module 910 may enable the server computer 900 to communicate over a network according to any appropriate communication protocol, such as TCP, UDP, etc. The communication module 910 may enable the server computer 900 to send, receive, and decrypt encrypted messages. Further, the communication module 910 may comprise any code needed to enable cryptographic operations, e.g., code for performing a Diffie-Hellman key exchange, in order to create a secure communication channel with a gateway.

The attack detection module 912 may comprise code, executable by the processor 902 for performing functions and other processes related to attack detection as described in the attack detection section above. These functions may include determining that the server computer 900 is under attack and classifying received network packets as attack packets or service packets. The attack detection model 912 may include code used to implement a machine learning model that can be trained and used to classify received network packets.

The gateway discovery module 914 may comprise code, executable by the processor 902 for performing processes related to gateway detection as described in the gateway discovery section above. This may include generating and transmitting DISCOVERY packets to gateways or an apparent attack source. It may also include routines or subroutines used to evaluate managed IP ranges to determine if the IP address of an apparent attack source is within those managed IP ranges. The gateway discovery module 914 may also comprise code allowing the server computer 900 to generate a list of gateways, Glist.

The spoof checking module 916 may comprise code, executable by the processor 902 for performing processes related to spoof checking. This may include calculating inter-packet times, generating PING packets, decrypting and evaluating CHECK packets, comparing or verifying digital stamps, etc., as described above in the section on spoof checking.

The optional reward module 916 may comprise code, executable by the processor 902 for generating, transmitting, and calculating the value of rewards, including the initial reward, the learning reward, and service rewards. The reward module 916 may additionally comprise code enabling the processor 902 to generate authorization request messages in order to transmit a monetary award to the gateway. Further, the reward module 916 may comprise code enabling the processor 902 to generate cryptocurrency based rewards and transfer there cryptocurrency rewards from a wallet or address associated with the server computer 900 to the gateway.

The gateway selection module 920 may comprise code, executable by the processor 902 for performing functions, operations, and processes associated with gateway selection, as described above in the section on gateway selection. This may include the generation of random numbers or the randomized selection of gateways. The gateway selection module 920 may additionally comprise code allowing the server computer 900 to compare bids received from different gateways or the latencies associated with different gateways as part of selecting a gateway. For example, the server computer 900 could select a gateway with the highest latency, and could compare the latencies of the different gateways in order to identify this gateway. As another example, the server computer 900 could select the gateway with the lowest bid.

The learning process module 922 may comprise code, executable by the processor 902 for performing the learning process with the selected gateway, along with any other operations used during the learning phase, as described above. For example, the learning process module 922 may comprise code enabling the server computer 900 to determine the maximum number of rounds in a learning process, or evaluate a utility value during the learning process and terminate the learning process if the utility value is less than a utility threshold. Further, the learning process module 922 may comprise code enabling the processor 902 to label sets of training packets to provide to the gateway, as well as evaluate test packets received from the gateway.

The deployment verification module 924 may comprise code, executable by the processor 902 for performing the deployment verification process, as described above with reference to FIG. 8. This may include directing the processor 902 to utilize other software modules, such as the spoof checking module and the attack detection module. The code in the deployment verification module 924 may be executed by the processor 902 in order to evaluate incoming packets and determine if the server computer is under attack, perform a spoof check, evaluate inter-packet times, etc.

The conflict resolution module 926 may comprise code, executable by processor 902 for participating in a conflict resolution process with a third party computer, as described above. This may include updating a server log to include a BREACH string, and transmitting the server log to a third party computer for conflict resolution.

VI. Gateway

Figure 10:
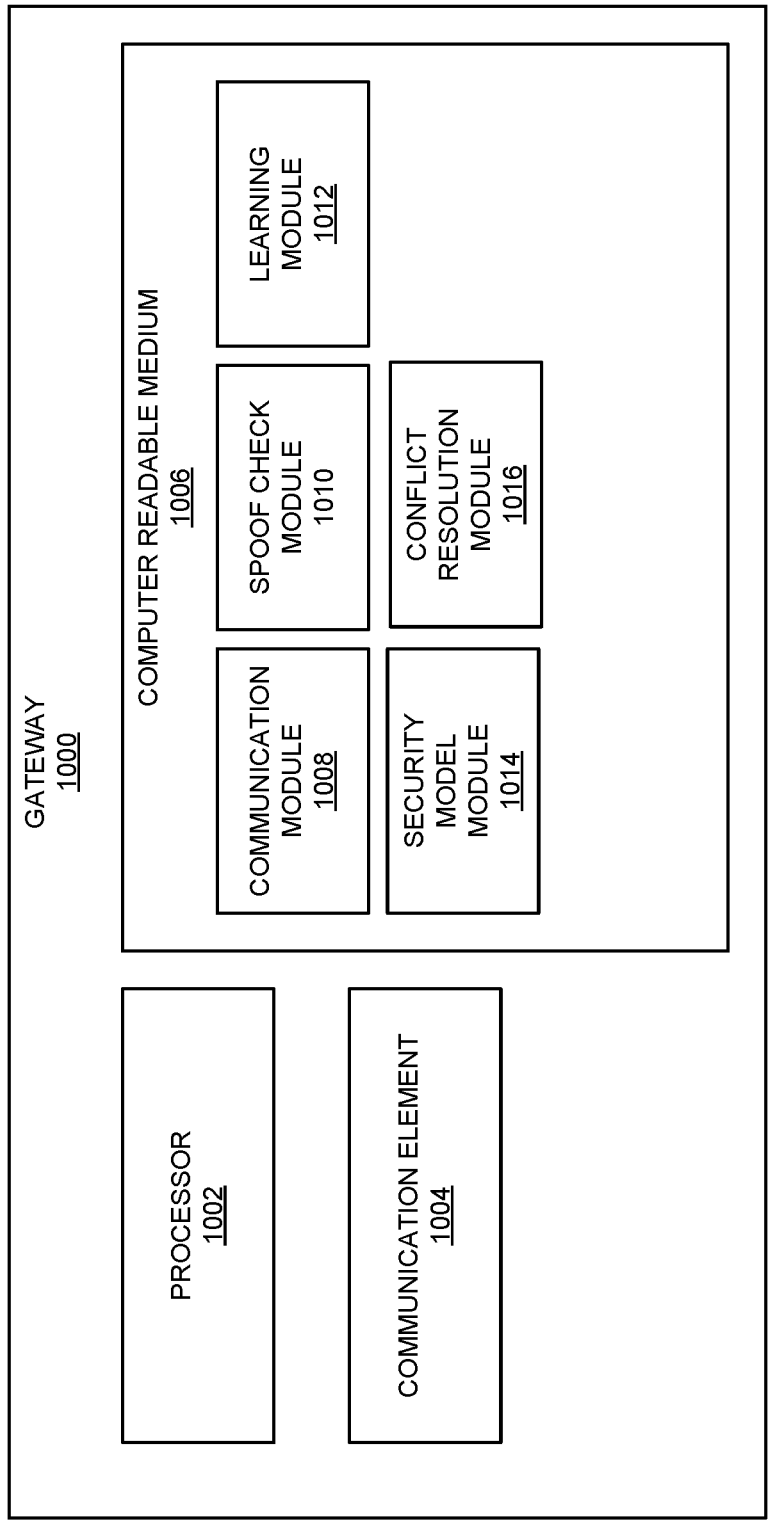
FIG. 10 shows a block diagram of a gateway according to some embodiments.

FIG. 10 shows a block diagram of a gateway 1000 according to some embodiments of the invention. The gateway 1000 can comprise a processor 1002, a communication element 1004, and a computer readable medium 1006. The computer readable medium 1006 may store a number of software modules or other code, executable by the processor 1002 for performing different phases, steps, or processes of methods according to embodiments. These software modules may include a communication module 1008, a spoof check module 1010, a learning module 1012, a security model module 1014, and a conflict resolution module 1016.

The communication module 1008 may comprise code, executable by the processor 1002 to generate messages, reformat messages, and/or otherwise communicate with other entities or computers. This may include sending and receiving packets such as PING packets, DISCOVERY packets, CHECK packets, ECHO packets, sets of training packets, sets of testing packets, etc. as described above. The communication module 1008 may enable the gateway 1000 to communicate over a network according to any appropriate communication protocol, such as TCP, UDP, etc. The communication module 1008 may enable the gateway 1010 to send and receive, and decrypt encrypted messages, as well as decrypt messages and encrypt messages. Further, the communication module 1008 may comprise any code needed to enable such cryptographic operations, e.g., code for performing a key exchange in order to establish a secure communication channel with a server computer.

The spoof check module 1010 may comprise code, executable by processor 1002 for performing any appropriate spoof checking processes, as described above. This may include generating a digital stamp, evaluating a PING packet to determine the product of a first inter-packet time and a wait time factor, generating an encrypted CHECK packet, transmitting the encrypted CHECK packet to a server computer, stamping received network packets using the digital stamp, transmitting the stamped network packets to the server computer, receiving and evaluating an ECHO packet, etc.

The learning module 1012 may comprise code, executable by the processor 1002 to perform the learning process and other related learning phase processes, as described above. This may include training a security model using training packets received from a server computer and producing a set of classifications corresponding to test packets, and transmitting those classifications back to the server computer for accuracy evaluation.

The security model module 1014 may comprise code, executable by the processor for using the security model to classify network packets as service packets or attack packets, for example, during the learning process or during the service phase.

The conflict resolution module 1016 may comprise code, executable by processor 1002 for participating in a conflict resolution process with a third party computer, as described above. This may include updating a gateway log to include a BREACH string, and transmitting the gateway log to the third party computer for conflict resolution. For example, the gateway 1000 may initiate conflict resolution if the server computer does not provide the correct learning reward or misses a periodic service payment.

VII. Analysis

This section provides bounds on some parameters used in methods according to some embodiments in order to give a precise understanding of how the values of the parameters may be set during those methods.

A first lemma proves an upper bound on the reward that the gateway can collect during the learning phase. This upper bound can be used to determine the cost of outsourcing attack prevention from the server to the gateway.

Lemma 1. (Maximum Learning Reward) The maximum reward that the gateway can collect in r rounds is $\rho_1 nr$, where n is the maximum number of training and testing examples set in any round and $\rho_1$ is the initial reward.

Proof. The reward $R_r$ collected at the end of round r is given by:

$$R_r = \sum_{i \leq r} (n_i/e) \leq \rho_r \sum_{i \leq r} (n/e)$$

From:
$$\rho_r = \rho_1 \pi_{1=2}^{r}(1+a_i-a_{i-1})$$

It follows that:

$$R_r \leq \frac{\rho_1 nr}{e} \prod_{i=2}^{r} (1 + a_i - a_{i-1})$$

Using the fact that $1+x \leq e^x$ for all $x \in \mathbb{R}$:

$$R_r \leq \frac{\rho_1 nr}{e} \prod_{i=2}^{r} e^{a_i - a_{i-1}} =$$

$$\frac{\rho_1 nr}{e} \exp\left(\sum_{i=2}^{r} (a_i - a_{i-1})\right) = \frac{\rho_1 nr}{e} e^{a_r - a_1} \leq \rho_1 nr$$

Where the last inequality follows from the fact that the total change in accuracy cannot be larger than one.

Given this bound, the following lemma shows a lower bound on the number of rounds of training and testing in order to terminate with at least some predefined accuracy threshold. Note that this bound is independent of the underlying learning algorithm used and is purely an artifact of the termination criterial used by the server based on the weight given to attack prevention and total reward.

Lemma 2. (Minimum Number of Training Rounds) For a given $\varepsilon \in (0,1)$, the minimum number of rounds required by an ($\alpha$, $\beta$, $\tau$)-rational server to terminate with at most $\varepsilon$ error tolerance, an initial reward of $\rho_1$ and n training and testing examples per round is more than $$\frac{\alpha(1-\varepsilon)-\tau}{\beta n \rho_1}.$$

Proof. If the server wants to terminate learning at the end of round r, then by the definition of its utility, it must be the case that:
$$\alpha a_r - \beta R_r < \tau$$

From Lemma 1:
$$R_r \leq \rho_1 nr$$

Which gives:

$$\rho_1 nr > \frac{\alpha a_r - \tau}{\beta}$$

Thus to obtain $a_r \geq 1-\varepsilon$, it must be the case that:

$$\rho_1 nr > \frac{\alpha(1-\varepsilon)-\tau}{\beta}$$

Which gives:

$$r > \frac{\alpha(1-\varepsilon)-\tau}{\beta n \rho_1}$$

With a known minimum number of rounds required to complete training with a given accuracy, the server computer now has a good estimate of the total cost of carrying out the learning task. This knowledge can be used to set the bid for the initial reward during the negotiation phase and defines the server's true valuation of the cost of attack prevention.

Lemma 3. (Minimum Initial Bid for Server) If the average inter packet time at the time of attack detection is $\Delta$ and the total number of attack packets used for training or testing per round is n, then to obtain service for a $\Gamma_{service}$ long time period, an ($\alpha$, $\beta$, $\tau$)-rational server must set its bid for the initial reward to at least $$\frac{1}{\beta n}\left(\alpha\left(1 - \frac{\Delta}{\Gamma_{service}}\right) - \tau\right).$$

Proof. From Lemma 2, if the minimum accuracy required by the server computer to complete the learning process is $\varepsilon$, then the minimum number of rounds required in the learning phase is more than $$\frac{\alpha(1-\varepsilon)-\tau}{\beta n \rho_1}.$$

This gives $$\rho_1 \geq \frac{\alpha(1-\varepsilon)-\tau}{\beta nr},$$

where r is the index of the last learning round. Since r is unknown at the beginning of the protocol, the inequality must hold for any round index $r \geq 1$. This gives $$\rho_1 \geq \frac{\alpha(1-\varepsilon)-\tau}{\beta n}.$$

As shown above, $$\varepsilon \leq \frac{\Delta}{\Gamma_{service}}.$$

This lemma statement then follows from combining these inequalities and using the fact that the initial reward is never greater than the server computer's bid.

The following lemma gives a bound on the maximum number of installments the server computer should accept for paying the gateway its deployment fee. A large number of installments may not give the server computer enough time to perform the spoof check on attack packets received during the service period. By establishing an upper bound, the server computer is able to perform a spoof check on attack packets received during the service period, allowing the server computer to determine if the gateway has deployed the security model.

Lemma 4. (Maximum Number of Installments) For a given initial reward $\rho_1$, an $(\alpha, \beta, \tau)$-rational server that plans to provide a total of n examples to the gateway in each round of training must pay the service fee to the gateway in at most $$O\left(\frac{\alpha}{\alpha - (\beta n \rho_1 + \tau)}\right)$$

installments to provide sufficient time to run the spoof-check protocol during the deployment verification phase.

Proof. The total number of installments $\tau$ that the server agrees to divide the deployment reward in is $O(1/\varepsilon)$, where $\varepsilon$ is the minimum test set accuracy required by the server upon termination of the learning phase. By Lemma 3, $$\varepsilon \geq 1 - \left(\frac{\beta n \rho_1 + \tau}{\alpha}\right),$$

giving the lemma statement result.

VIII. Empirical Study

This section describes experimental results obtained for a small scale, proof-of-concept prototype of a method according to some embodiments. The prototype was coded in Python 2.7, and the sklearn library [33] was used to implement the logistic regression classifier for gateway training. The code was tested on a 2015 Macbook Pro with 8 GB-1.6 GHz RAM and 2.2 GHz Intel Core i7 processor.

The experiment used an anonymized 120-day subset of a dataset used for detecting malicious URLs from [27]. The anonymized 120-day subset comprises 2.4 million example URLs and 3.2 million features.

The data corresponding to each day was initially processed to reduce the number of features to 50, selected at random from the subset of features for which more than 75% of the URLs had non-zero values. By reducing the number of features, the initial processing reduced the added complexity of the learning algorithm due to a high number of features.

In each round of the learning phase, 100,000 URLs were used for training and 10,000 URLs were used for testing. New examples for training and testing were chosen in each round. A total of 120 data subsets were used to obtain the running time average of the learning phase.

A multiplexing scheme with fixed total bandwidth was used to simulate the attack packet frequency at a constant 0.1. An abstraction of this frequency was modeled by specifying the attack packet fraction of all packets sent from the gateway to the server, and using the remaining fraction for packets exchanged during execution of the protocol.

The following observations were made from the experiment. A first observation is that the number of rounds required to train the gateway's model is small. The experiment studied the accuracy of test example classification in each round and observed that for constant attack packet frequency of 0.1, by the end of the first training round, the gateway achieved an average classification accuracy of 99.92% on the test examples. Average classification accuracy reached 99.9994% by the end of two rounds, and average classification accuracy was close to 100% by the end of three rounds. The average time required to produce classifications on the test examples for each round was 379.32 ms. This suggests that within three rounds, or about one second on average, the gateway was able to learn a model that classifies test examples with near-perfect accuracy. This demonstrates the speed and effectiveness of methods according to some embodiments, as only one second is needed for a gateway to learn a model that can stop almost all attack packets passing through that gateway, quickly and efficiently preventing attacks on the server computer.

A second observation is that for a fixed attack, the time required for the server computer and gateway to prevent the attack increases as the attack rate increases. As mentioned above, the average round time was 379.32 ms for an attack packet frequency of 0.1. As the attack frequency was increases from 0.1 to 1 in increments of 0.01, the average round time increased almost monotonically. As an example, for an attack packet frequency of 0.62, the average round time was approximately 4.1 minutes. It is suspected that as attack frequency increases, the message delivery time of methods according to embodiments increases, and hence the round length increases.

IX. Advantages

Embodiments provide a number of advantages over conventional firewall systems. Conventionally, a server computer will rely on its own firewall to block malicious network packets. However, real-time detection of attack packets among a large quantity of incoming network traffic is difficult at busy server computers. Gateways typically receive a smaller amount of network traffic than server computers. Additionally, network packets received at gateways are typically easier to classify. Further, because the network packets received at a gateway are typically easier to classify, a security model deployed at a gateway also produces a lower false positive rate than a security model at a server computer.

Because there are typically a number of gateways between a server computer and an attack source, methods according to embodiments are also more flexible than conventional firewall systems. Security models can be deployed at multiple different gateways simultaneously, compared to a conventional firewall system that only implements packet filtering at the server computer. Offloading the filtering policy has an additional benefit in that it reduces the cost and complexity of managing a security policy in highly scalable distributed internet services.

Additionally, because the server computer offloads network packet classification to the gateway, the server computer does not require the full functionality of a conventional Network Intrusion Detection System (NIDS). As a result, methods according to embodiments can be performed by low-energy devices, such as smart household Internet of Things (IoT) devices.

As demonstrated in the empirical study section, methods according to embodiments can result in quick training of an accurate security model, requiring only three training rounds to achieve a near 100% classification rate.

X. Computer System

Figure 11:
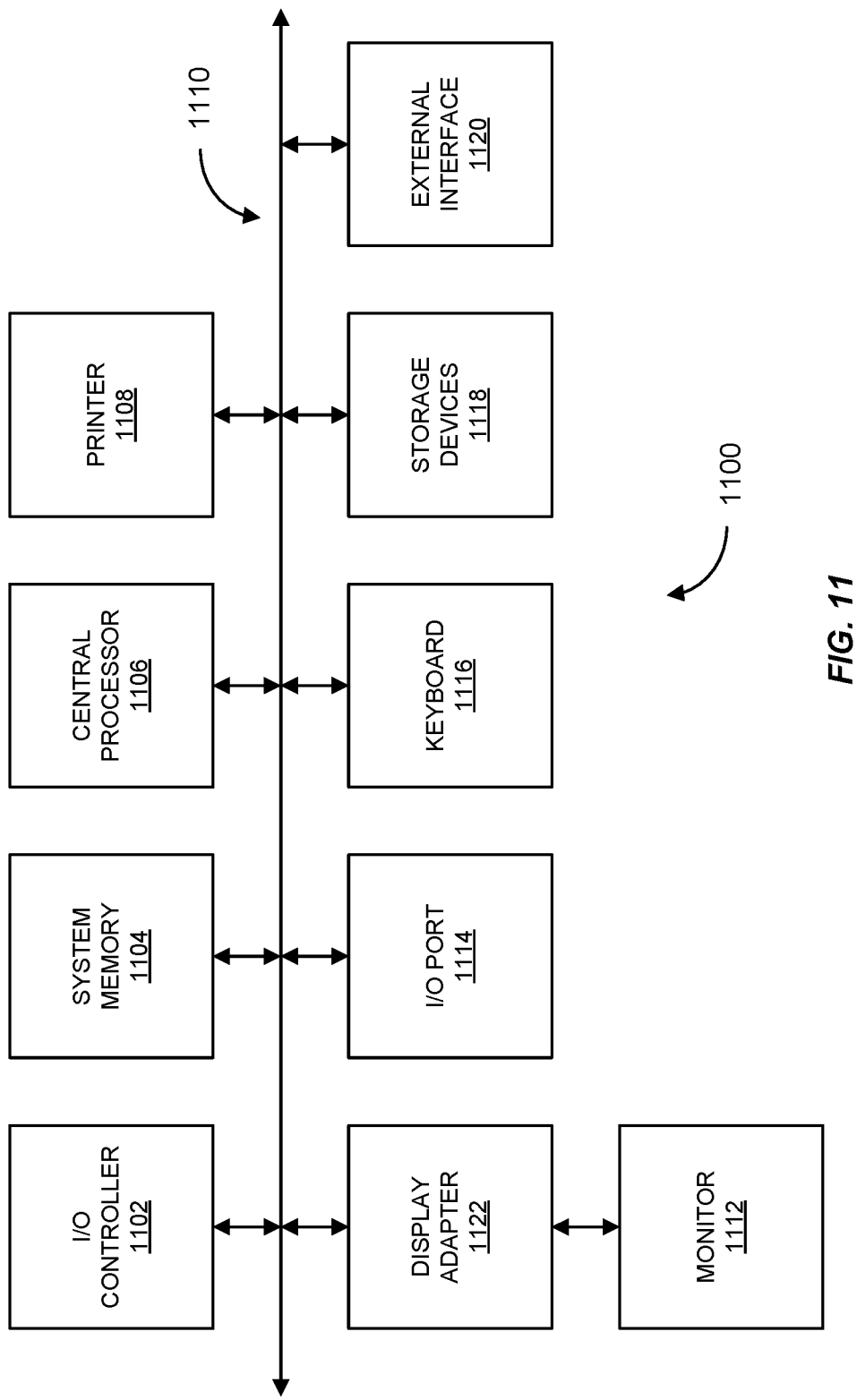
FIG. 11 shows a block diagram of a computer system and associated peripherals capable of performing methods according to some embodiments.

Any of the computer systems mentioned herein may utilize any suitable number of subsystems. Examples of such subsystems are shown in FIG. 11 in computer apparatus 1100. In some embodiments, a computer system includes a single computer apparatus, where the subsystems can be components of the computer apparatus. In other embodiments, a computer system can include multiple computer apparatuses, each being a subsystem, with internal components.

The subsystems shown in FIG. 11 are interconnected via a system bus 1110. Additional subsystems such as a printer 1108, keyboard 1116, storage device(s) 1118, monitor 1112, which is coupled to display adapter 1122, and others are shown. Peripherals and input/output (I/O) devices which couple to I/O controller 1102, can be connected to the computer system by any number of means known in the art such as input/output (I/O) port 1114 (e.g., USB, FireWire®). For example, I/O port 1114 or external interface 1120 (e.g. Ethernet, Wi-Fi, etc.) can be used to connect computer system 1100 to a wide area network such as the Internet, a mouse input device, or a scanner. The interconnection via system bus 1110 allows the central processor 1106 to communicate with each subsystem and to control the execution of instructions from system memory 1104 or the storage device(s) 1118 (e.g., a fixed disk, such as a hard drive or optical disk), as well as the exchange of information between subsystems. The system memory 1104 and/or the storage device(s) 1118 may embody a computer readable medium. Any of the data mentioned herein can be output from one component to another component and can be output to the user.

A computer system can include a plurality of the same components or subsystems, e.g., connected together by external interface 1120 or by an internal interface. In some embodiments, computer systems, subsystems, or apparatuses can communicate over a network. In such instances, one computer can be considered a client and another computer a server, where each can be part of a same computer system. A client and a server can each include multiple systems, subsystems, or components.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, and of the steps of any of the methods can be performed with modules, circuits, or other means for performing these steps.

The specific details of particular embodiments may be combined in any suitable manner without departing from the spirit and scope of embodiments of the invention.

However, other embodiments of the invention may be directed to specific embodiments relating to each individual aspect, or specific combinations of these individual aspects. The above description of exemplary embodiments of the invention has been presented for the purpose of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary. The use of "or" is intended to mean an "inclusive or," and not an "exclusive or" unless specifically indicated to the contrary.

All patents, patent applications, publications and description mentioned herein are incorporated by reference in their entirety for all purposes. None is admitted to be prior art.

REFERENCES

[1] https://usa.visa.com/pay-with-visa/visa-checkout.html
[2] https://www.paypal com/us/home.
[3] https://www.google.com/wallet/.
[4] https://www.apple.com/apple-pay/.
[5] Liad Blumrosen and Shahar Dobzinksi. "(Almost) Efficient Mechanisms for Bilateral Trading". In: *arXiv preprint arXiv:* 1604.04876

[6] Benjamin Braun et al. "Verifying computations with state". In: *Proceedings of the Twenty-Fourth ACM Symposium on Operating Systems Principles*. ACM. 2013, pp. 341-357.

[7] Ferhat Özgür Çatak. "Secure multi-party computation based privacy preserving extreme learning machine algorithm over vertically distributed data". In: *International Conference on Neural Information Processing*. Springer. 2015, pp. 337-345.

[8] Kamalika Chaudhuri and Claire Monteleoni. "Privacy preserving logistic regression". In: *Advances in Neural Information Processing Systems*. 2009, pp. 289-296.

[9] Alessandro Chiesa, Eran Tromer, and Madars Virza. "Cluster Computing in Zero Knowledge." In: *IACR Cryptology ePrint Archive* 2015 (2015), p. 377.

[10] Riccardo Colini-Baldeschi et al. "Approximately efficient double auction with strong budget balance". In: *Proceedings of the Twenty-Seventh Annual ACM-SIAM Symposium on Discrete Algoirthms*. Society for Industrial and Applied Mathematics. 2016, pp. 1424-1443.

[11] Graham Cormode, Michael Mitzenmacher, and Justin Thaler. "Practical verified computation with streaming interactive proofs". In: *Proceedings of the 3rd Innovations in Theoretical Computer Science Conference*. ACM. 2012, pp. 90-112.

[12] Yitao Duan and John Canny. "Practical private computation and zero-knowledge tools for privacy-preserving distributed data mining". In: *Proceedings of the 2008 SIAM International Conference on Data Mining*. SIAM. 2008, pp. 265-276.

[13] Zahra Ghodsi, Tianyu Gu, and Siddharth Garg. "SafetyNets: Verifiable Execution of Deep Neural Networks on an Untrusted Cloud". In: *arXiv preprint arXiv:1706.10268* (2017).

[14] Seth Gilbert et al. "Resource-competitive analysis: A new perspective on attack-resistant distributed computing". In: *Proceedings of the 8th international Workshop on Foundations of Mobile Computing*. ACM. 2012, p. 1.

[15] Oded Goldreich and Yair Oren. "Definitions and properties of zero-knowledge proof systems". In: *Journal of Cryptology* 7.1 (1994), pp. 1-32.

[16] Oded Goldreich and Guy N Rothblum. "Simple doubly-efficient interactive proof systems for locally characterizable sets." In: *Electronic Colloquium on Computational Complexity (ECCC)*. Vol. 24.2017, p. 18.

[17] Shafi Goldwasser. "Interactive proof systems". In: *Computational Complexity Theory* 38 (1989), pp. 108-128.

[18] Shafi Goldwasser, Yael Tauman Kalai, and Guy N Rothblum. "Simple doubly-efficient interactive proof systems for locally-characterizable sets." In: *Proceedings of the fortieth annual ACM symposium on Theory of computing*. ACM. 2008, pp. 113-122.

[19] Wassily Hoeffding. "Probability inequalities for sums of bounded random variables". In: *Journal of the American statistical association* 58.301 (1963), pp. 13-30.

[20] B. Huffaker, M. Fomenkov, and K. Claffy. *Statistical implications of augmenting a BGP-inferred AS-level topology with traceroute-based inferences—Technical Report*. Tech. rep. Center for Applied Internet Data Analysis (CAIDA), 2016.

[21] Yuval Ishai, Eyal Kushilevitz, and Rafail Ostrovsky. "Efficient arguments without short PCPs". In: *Computational Complexity, 2007. CCC'07. Twenty-Second Annual IEEE Conference on*. IEEE. 2007, pp. 278-291.

[22] Ryan Kearny. "Of Needles and Haystacks: Spotting Bad Network Traffic In The Age of Botnets". In: *Forbes* ( ).

[23] Hung-Jen Liao et al. "Intrusion detection system: A comprehensive review". In: *Journal of Network and Computer Applications* 36.1 (2013), pp. 16-24.

[24] Yehuda Lindell and Benny Pinkas. "Privacy preserving data mining". In: *Advances in Cryptology? CRYPTO 2000*. Springer. 2000, pp. 36-54.

[25] Yehuda Lindell and Benny Pinkas. "Secure multiparty computation for privacy-preserving data mining". In: *Journal of Privacy and Confidentiality* 1.1 (2009), p. 5.

[26] Teresa F Lunt et al. "Real-time intrusion detection." In: *COMPCON*. 1989, p. 353.

[27] Justin Ma et al. "Identifying suspicious URLs: an application of large-scale online learning". In: *Proceedings of the 26$^{th}$ annual international conference on machine learning*. ACM. 2009, pp. 681-688.

[28] Payman Mohassel and Yupeng Zhang. "SecureML: A System for Scalable Privacy-Preserving Machine Learning." In: *IACR Cryptology ePrint Archive* 2017 (2017), p. 396.

[29] Roger B Myerson and Mark A Satterthwaite. "Efficient mechanisms for bilateral trading". In: *Journal of economic theory* 29.2 (1983), pp. 265-281.

[30] Olga Ohrimenko et al. "Oblivious Multi-Party Machine Learning on Trusted Processors." In: *USENIX Security Symposium*. 2016, pp. 619-636.

[31] Bryan Parno et al. "Pinocchio: Nearly practical verifiable computation". In: *Security and Privacy (SP), 2013 IEEE Symposium on*. IEEE. 2013, pp. 238-252.

[32] Manas A Pathak. *Privacy-preserving machine learning for speech processing*. Springer Science & Business Media, 2012.

[33] Fabian Pedregosa et al. "Scikit-learn: Machine learning in Python". In: *Journal of Machine Learning Research* 12. Oct (2011), pp. 2825-2830.

[34] Shahid Raza, Linus Wallgren, and Thiemo Voigt. "SVELTE: Real-time intrusion detection in *Ad hoc networks* 11.8 (2013), pp. 2661-2674.

[35] Omer Reingold, Guy N Rothblum, and Ron D Rothblum. "Constant-round interactive proofs for delegating computation". In: *Proceedings of the forty-eighth annual ACM symposium on Theory of Computing*. ACM. 2016, pp. 49-62.

[36] Srinath Setty et al. "Resolving the conflict between generality and plausibility in verified computation". In: *Proceedings of the 8th ACM European Conference on Computer Systems*. ACM. 2013, pp. 71-84.

[37] Srinath TV Setty et al. "Making argument systems for outsourced computation practical (sometimes)." In: *NDSS*. Vol. 1. 9. 2012, p. 17.

[38] Srinath TV Setty et al. "Taking Proof-Based Verified Computation a Few Steps Closer to Practicality." In: *USENIX Security Symposium*. 2012, pp. 253-268.

[39] Justin Thaler. "Time-optimal interactive proofs for circuit evaluation". In: *Advances in Cryptology—CRYPTO 2013*. Springer, 2013, pp. 71-89.

[40] Riad S Wahby et al. "Efficient RAM and control flow in verifiable outsourced computation." In: *NDSS*. 2015.

[41] Riad S Wahby et al. "Verifiable asics". In: *Security and Privacy (SP), 2016 IEEE Symposium on*. IEEE. 2016, pp. 759-778.

[42] Roman V Yampolskiy. "AI-complete CAPTCHAs as zero knowledge proofs of access to an artificially intelligent system". In: *ISRN Artificial Intelligence* 2012 (2011).

What is claimed is:

1. A method of deploying a protocol at a gateway, the method comprising performing, by a server computer:
   receiving a plurality of network packets, wherein the plurality of network packets comprises a plurality of attack packets that are part of an attack on the server computer and a plurality of service packets that are not part of the attack on the server computer;
   determining that the plurality of network packets comprises a plurality of attack packets;
   selecting a gateway through which the plurality of attack packets flow; and
   performing a learning process with the gateway, the learning process comprising one or more learning rounds, each learning round comprising:
      obtaining and labelling a set of training packets from the plurality of network packets, the set of training packets comprising one or more labeled attack packets and one or more labeled service packets;
      obtaining a set of unlabeled test packets from the plurality of network packets, the set of test packets comprising one or more unlabeled attack packets and one or more unlabeled service packets;
      transmitting, to the gateway, the set of training packets and the set of unlabeled test packets;
      receiving a set of test classifications from the gateway;
      determining an accuracy value based on a proportion of accurate classifications from the set of test classifications; and
      performing:
         responsive to the accuracy value being greater than or equal to an accuracy threshold, transmitting an acceptance of the security model to the gateway; or
         responsive to the accuracy value being less than the accuracy threshold, transmitting a rejection of the security model to the gateway.

2. The method of claim 1, wherein the gateway uses the set of training packets to train a security model, and wherein the gateway uses the security model to generate a set of test classifications corresponding to the set of unlabeled test packets.

3. The method of claim 1, wherein the set of training packets additionally comprise a set of labeled test packets from a previous learning round.

4. The method of claim 1, wherein a number of learning rounds is predetermined, and wherein the learning process further comprises:
   determining a round index;
   responsive to the round index being less than the number of learning rounds, proceeding to a subsequent learning round of the learning process; and
   responsive to the round index being greater than or equal to the number of learning rounds, terminating the learning process.

5. The method of claim 1, wherein the learning process further comprises:
   determining a reward value based on a previous reward value corresponding to a previous learning round or an initial reward value, the accuracy value, and a previous accuracy value corresponding to the previous learning round or zero;
   determining a utility value based on the reward value and the accuracy value;
   if the utility value is greater than or equal to a predetermined utility threshold, proceeding to a subsequent learning round of the learning process; and
   if the utility value is less than a predetermined utility threshold, terminating the learning process.

6. The method of claim 4 or 5, wherein responsive to the learning process being terminated, the method further comprises:
   selecting a previously unselected gateway from the plurality of gateways; and
   performing the learning process with the previously unselected gateway, wherein the method is repeated until either the server computer transmits an acceptance of the security model or all gateways from the plurality of gateways have been selected.

7. The method of claim 1, wherein selecting the gateway through which the plurality of attack packets flow comprises:
   determining a plurality of gateways based on the plurality of attack packets;
   determining a plurality of latencies corresponding to the plurality of gateways; and
   selecting the gateway with a greatest corresponding latency.

8. The method of claim 1, wherein the selecting the gateway through which the plurality of attack packets flow comprises determining a plurality of gateways based on the plurality of attack packets; and
   randomly selecting one of the plurality of gateways.

9. The method of claim 1, wherein the gateway uses a security model to filter a subsequent plurality of attack packets from a subsequent plurality of network packets before transmitting the subsequent plurality of network packets to the server computer, and wherein the method further comprises periodically transmitting a service reward to the gateway over a service time duration in a number of installments.

10. The method of claim 9, further comprising:
    updating a server log based on a result of the learning process;
    determining a first inter-packet time corresponding to the plurality of attack packets;
    receiving the subsequent plurality of network packets from the gateway;
    determining if the subsequent plurality of network packets comprises a plurality of subsequent attack packets;
    determining a second inter-packet time corresponding to the plurality of subsequent attack packets; and
    responsive to the second inter-packet time being less than or equal to a ratio of the first inter-packet time and the predetermined accuracy threshold:
       suspending periodically transmitting the service reward to the gateway,
       updating the server log to include a breach string, and
       transmitting the server log to a third party computer for conflict resolution.

11. The method of claim 1, wherein selecting a gateway through which the plurality of attack packets flow comprises:
    evaluating the plurality of attack packets to determine an IP address of an apparent attack source;
    transmitting a plurality of discovery packets to the apparent attack source;
    receiving a plurality of discovery response packets;
    determining a plurality of candidate gateways, a plurality of managed IP ranges corresponding to the plurality of candidate gateways, and a plurality of latencies corresponding to the plurality of gateways, based on the plurality of discovery response packets; and
    determining a plurality of gateways by performing a spoof check with each candidate gateway of the plurality of candidate gateways, wherein the plurality of gateways comprises candidate gateways that correspond to non-spoofed attack packets; and selecting the gateway through which the plurality of attack packets flow from the plurality of gateways.

12. The method of claim 11, wherein the spoof check comprises:

determining a first inter-packet time corresponding to the plurality of attack packets;

generating a ping packet comprising a product of the first inter-packet time and a wait time factor;

transmitting the ping packet to a candidate gateway, wherein the candidate gateway generates a first digital stamp, generates an encrypted check packet comprising the first digital stamp, and transmits the encrypted check packet to the server computer;

receiving the encrypted check packet from the candidate gateway;

determining the first digital stamp by decrypting the encrypted check packet;

receiving one or more stamped network packets from the candidate gateway over a period of time equal to the product of the first inter-packet time and a wait time factor, wherein the one or more stamped network packets are stamped with the first digital stamp;

determining if the one or more stamped network packets comprise a stamped attack packet; and responsive to the one or more stamped network packets comprising the stamped attack packet:

transmitting an echo packet comprising the stamped attack packet to the candidate gateway, receiving a verification packet from the candidate gateways, and including the candidate gateway in the plurality of gateways.

13. The method of claim 12, wherein the echo packet additionally comprises a commitment of a server valuation, and wherein the verification packet comprises a gateway valuation, and wherein the spoof check further comprises:

setting an initial reward equal to a minimum of the server valuation and the gateway valuation; and transmitting a statement of the initial reward and a commitment opening to the gateway, wherein the gateway opens the commitment of the server valuation and verifies that the initial reward equals the minimum of the server valuation and the gateway valuation.

14. The method of claim 12, wherein selecting the gateway from the plurality of gateways comprises:

randomly selecting one or more gateways from the plurality of gateways, wherein each selection probability of a plurality of selection probabilities corresponding to the plurality of gateways is proportional to a plurality of latencies corresponding to the plurality of gateways; and selecting the gateway from the one or more gateways, wherein the selected gateway is a gateway with a least corresponding initial reward.

15. A method of deploying a protocol by a gateway, the method comprising performing, by a gateway:

performing a learning process with a server computer, the learning process comprising one or more learning rounds, each learning round comprising:

receiving a labeled set of training packets comprising one or more labeled attack packets that are part of an attack on the server computer and one or more labeled service packets that are not part of the attack on the server computer, and an unlabeled set of test packets comprising one or more unlabeled attack packets that are part of the attack on the server computer and one or more unlabeled service packets that are not part of the attack on the server computer;

training a security model using the labeled set of training packets;

generating a set of test classifications corresponding to the set of unlabeled test packets;

transmitting the set of test classifications to the server computer;

responsive to an accuracy value being greater than an accuracy threshold, receiving an acceptance of the security model from the server computer; and responsive to the accuracy value being less than the accuracy threshold, receiving a rejection of the security model from the server computer.

16. The method of claim 15, further comprising:

updating a gateway log with a result of the learning process; and responsive to the accuracy value being greater than the predetermined accuracy threshold, receiving a learning reward from the server computer, wherein if the learning reward is not received:

updating the gateway log to include a breach string, and transmitting the gateway log to a trusted third party computer for conflict resolution.

17. The method of claim 15, further comprising:

updating a gateway log based on a result of the learning process;

receiving a subsequent plurality of network packets;

filtering a subsequent plurality of attack packets from the subsequent plurality of network packets;

transmitting the subsequent plurality of network packets to the server computer; and periodically receiving a service reward from the server computer over a service time duration in a number of installments; wherein if the service reward is not received from the server computer:

updating the gateway log to include a breach string, and transmitting the gateway log to a third party computer for conflict resolution.

18. The method of claim 15, further comprising:

performing a spoof check with the server computer, the spoof check comprising:

receiving a ping packet comprising a first inter-packet time and a wait time factor;

generating a first digital stamp;

generating an encrypted check packet comprising the first digital stamp;

transmitting, over a period of time equal to a product of the first inter-packet time and the wait time factor, one or more stamped network packets to the server computer, wherein the one or more stamped network packets are stamped with the first digital stamp and wherein the server computer determines if the one or more stamped network packets comprise a stamped attack packets;

responsive to the one or more stamped network packets comprising the stamped attack packet:

receiving an echo packet comprising the stamped attack packet from the server computer;

determining if a second digital stamp of the stamped attack packet matches the first digital stamp; and responsive to the second digital stamp matching the first digital stamp, transmitting a verification packet to the server computer, the verification packet indicating that an apparent attack source is not spoofing an IP address of the apparent attack source.

19. The method of claim 18, wherein the echo packet additionally comprises a commitment of a server valuation, wherein the verification packet comprises a gateway valuation, and wherein the spoof check further comprises:
receiving a statement of an initial reward and a commitment opening from the server computer;
determining the server valuation by opening the commitment of the server valuation using the commitment opening; and
verifying that the initial reward is equal to a minimum of the server valuation and the gateway valuation.

20. The method of claim 15, wherein the labeled set of training packets additionally comprise a set of labeled test packets from a previous learning round.

* * * * *